United States Patent [19]

Rorden et al.

[11] Patent Number: 4,710,708

[45] Date of Patent: Dec. 1, 1987

[54] METHOD AND APPARATUS EMPLOYING RECEIVED INDEPENDENT MAGNETIC FIELD COMPONENTS OF A TRANSMITTED ALTERNATING MAGNETIC FIELD FOR DETERMINING LOCATION

[75] Inventors: Louis H. Rorden, Los Altos; Thomas C. Moore, Sunnyvale, both of Calif.

[73] Assignee: Develco, San Jose, Calif.

[21] Appl. No.: 401,267

[22] Filed: Jul. 23, 1982

Related U.S. Application Data

[63] Continuation-in-part of Ser. No. 257,645, Apr. 27, 1981, abandoned, which is a continuation-in-part of Ser. No. 36,017, May 4, 1979, abandoned.

[51] Int. Cl.$^4$ .................. G01B 7/14; G01C 21/00; G01S 3/02; G01G 7/78
[52] U.S. Cl. .................................. 324/207; 364/449; 342/459
[58] Field of Search .................. 324/207, 208, 226; 340/870.31; 364/449, 300; 343/459, 463, 464, 450, 451

[56] References Cited

U.S. PATENT DOCUMENTS

| | | | |
|---|---|---|---|
| 3,453,624 | 7/1969 | Rockey | 343/451 |
| 3,715,758 | 2/1973 | Sender | 343/463 |
| 3,828,867 | 8/1974 | Elwood | 175/45 |
| 3,868,565 | 2/1975 | Kuipers | 343/450 |
| 3,900,878 | 8/1975 | Tsao | 343/459 |
| 3,922,677 | 11/1975 | Tomkewitsch et al. | 343/459 |
| 3,967,201 | 6/1976 | Rorden | 455/40 |
| 3,983,474 | 9/1976 | Kuipers | 343/450 |
| 4,023,093 | 5/1977 | Aslan | 324/247 |
| 4,054,881 | 10/1977 | Raab | 343/463 |
| 4,163,977 | 8/1979 | Polstroff | 343/463 |
| 4,247,869 | 11/1981 | Schnaibel | 324/207 |
| 4,314,251 | 2/1982 | Raab | 343/463 |

Primary Examiner—Ernest F. Karlsen
Assistant Examiner—Walter E. Snow
Attorney, Agent, or Firm—Harry E. Aine

[57] ABSTRACT

The location method uses relatively low frequency electromagnetic fields, e.g., 1–1000 Hz, for determining the relative position and/or orientation of a transmitting magnetic dipole antenna by using a vector field receiver. The transmitting antenna for subterranean location, is preferably a single axis, elongated solenoid with a ferromagnetic core. The receiving sensor may be a precise three-axis magnetic field detector of either a magnetometer or search coil type. Measurements are made for one or more positions of either the transmitter or receiver, or with one or more transmitters or receivers. The relative location of the transmitter and the receiver is calculated with respect to some known survey station by a method of successive approximations. The operating frequency is chosen to minimize field distortion from common steel structures, such as pipe, casing or railroad tracks, and to minimize field scattering such as from conducting inhomogeneities in the earth. Either the transmitter or receiver can be operated within metal structures such as casing. The method can be used for location of underground boreholes or pipelines; location of trapped miners; as a means of blind surveying such as in underground mines; or as a means of navigation such as in relatively shallow horizontal or vertical drilling and tunneling or in raise bore mining.

20 Claims, 22 Drawing Figures

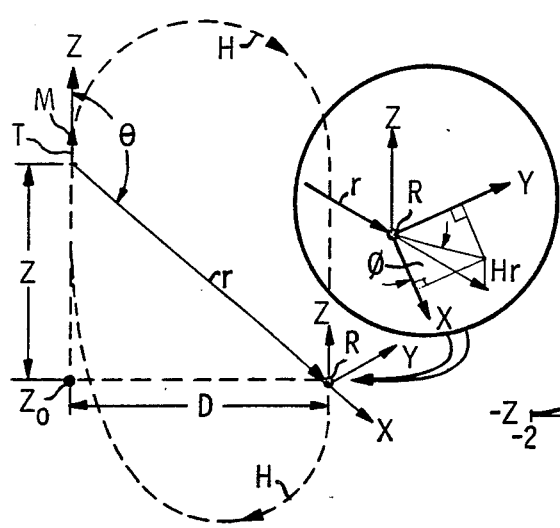
Fig_1
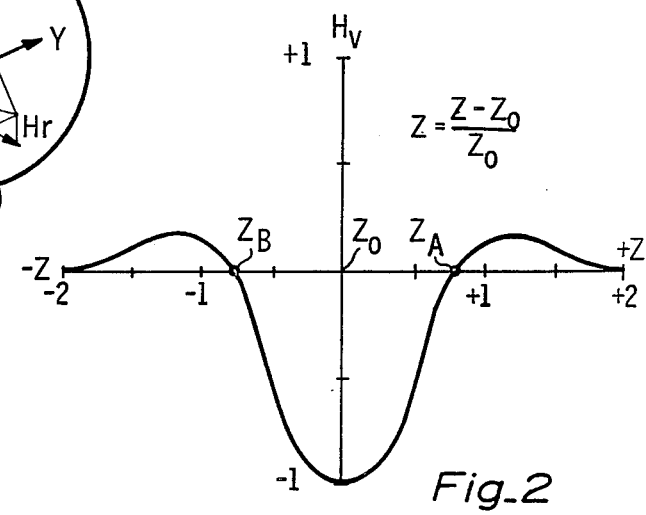
Fig_2
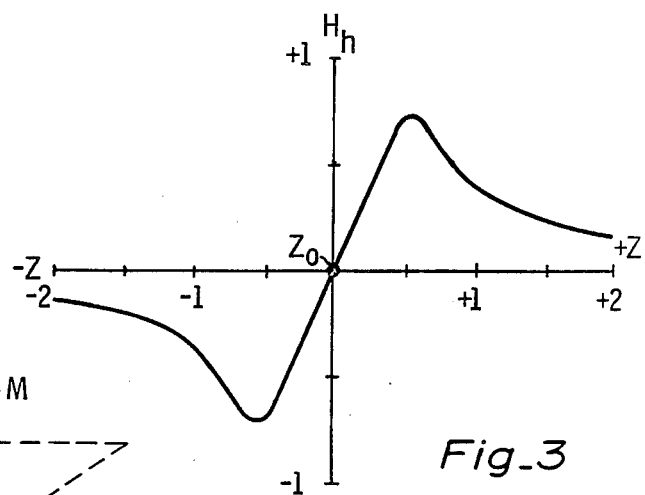
Fig_3
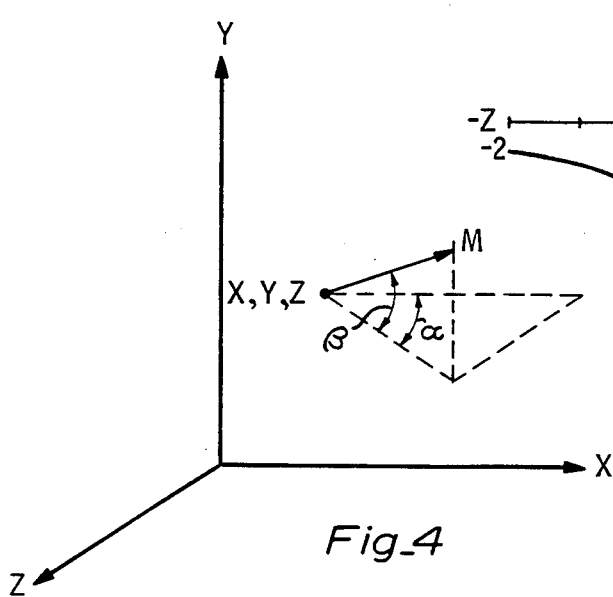
Fig_4

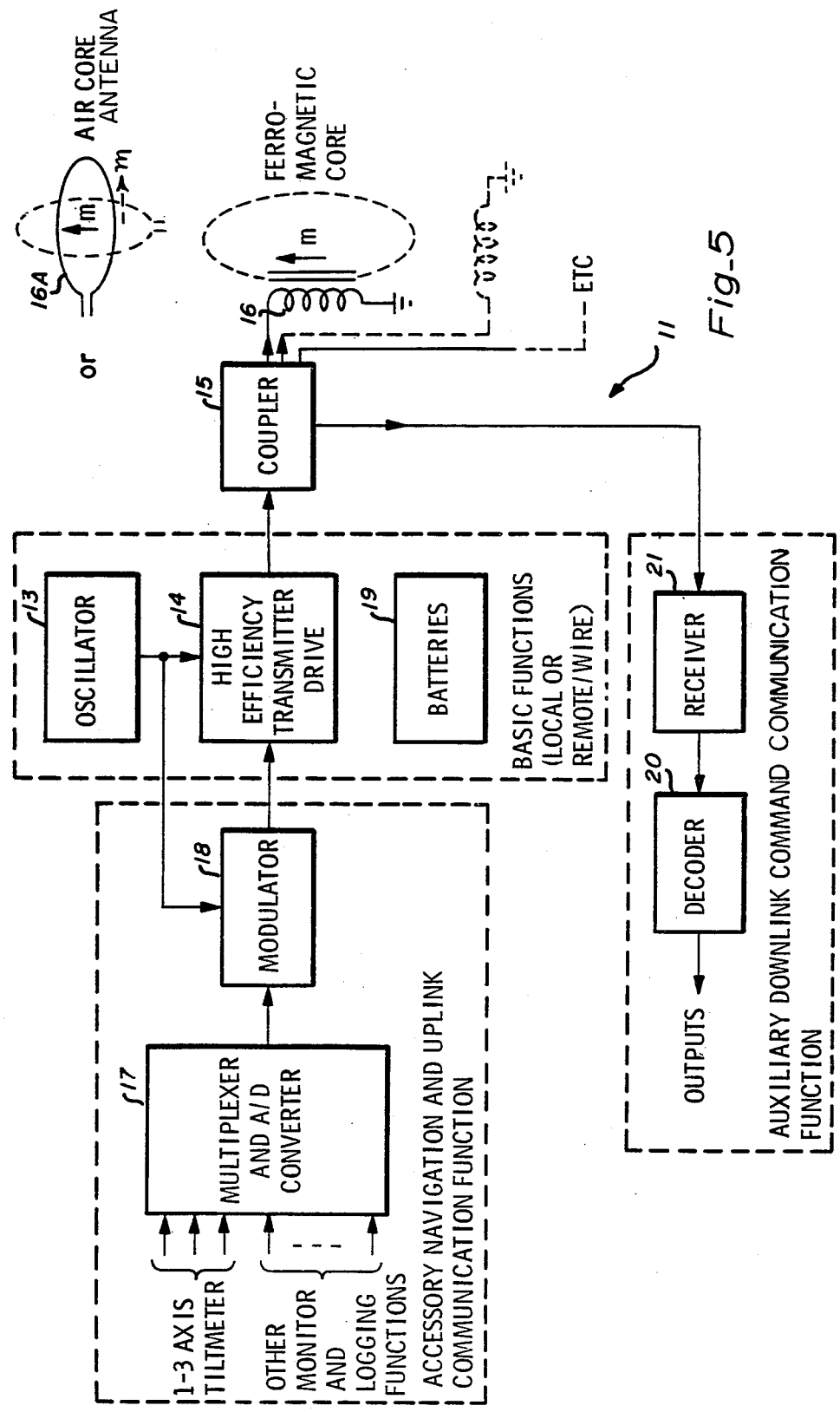
Fig_5

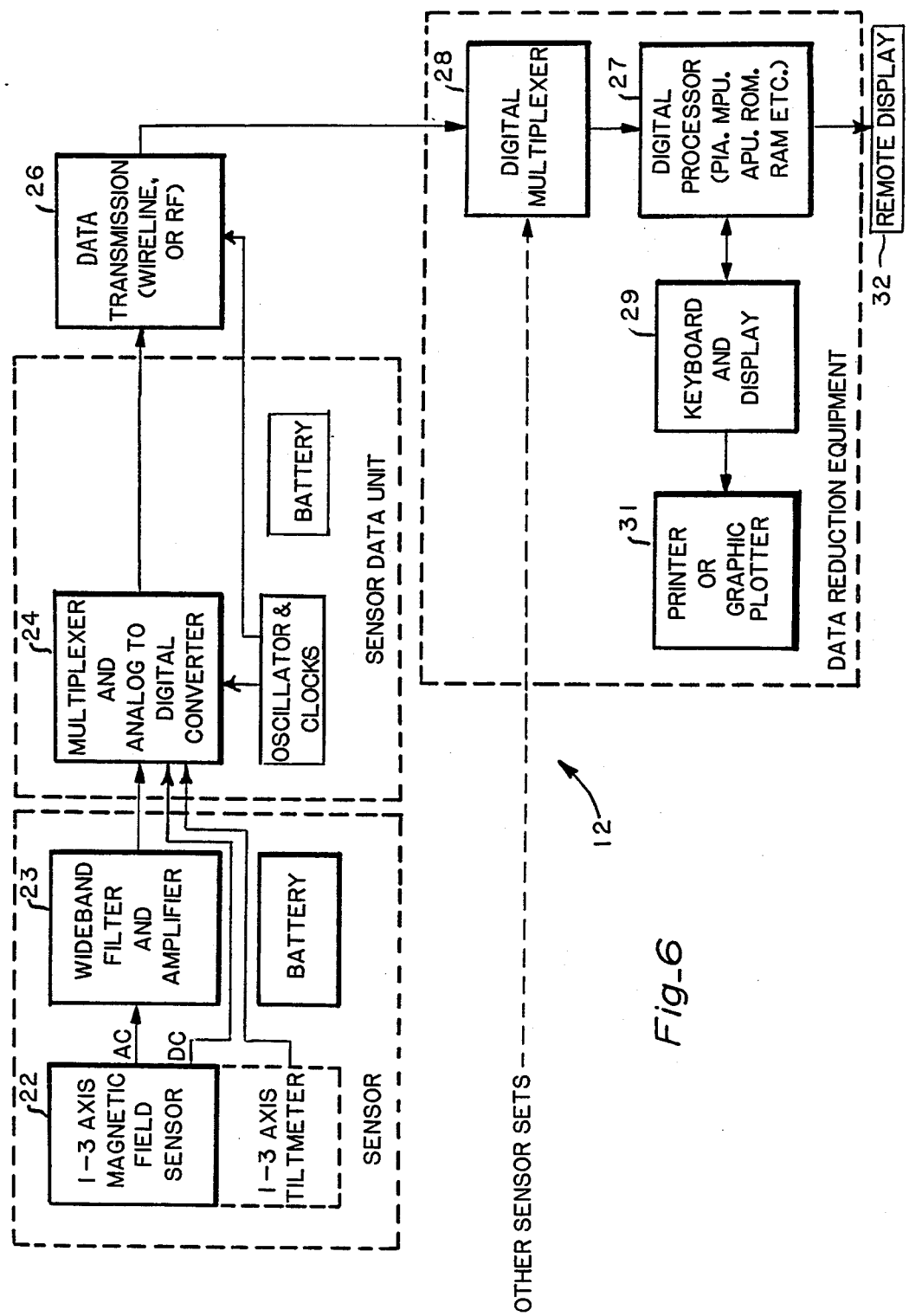
Fig_6

ONE SINGLE AXIS TRANSMITTER & PLURAL THREE AXES RECEIVERS
DRILLING & MINING
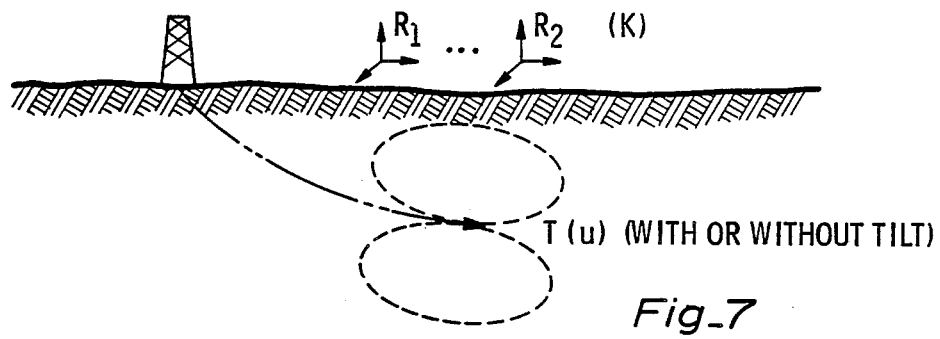
Fig_7
MINING
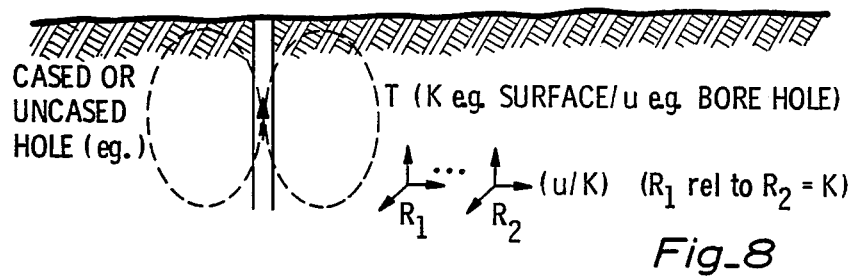
Fig_8
BLIND (ROUGH) SURVEYING
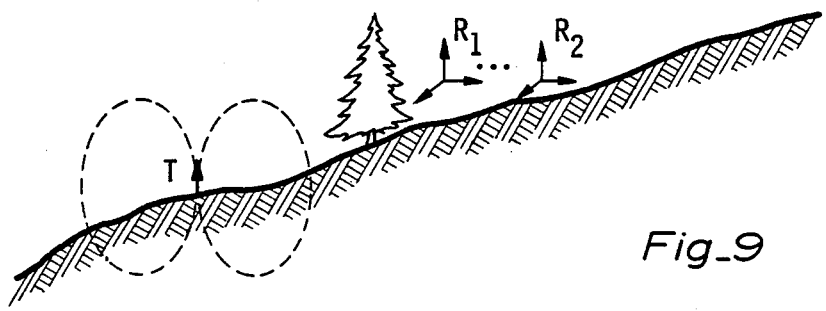
Fig_9

ONE SINGLE AXIS RECEIVER & PLURAL THREE-AXES TRANSMITTERS
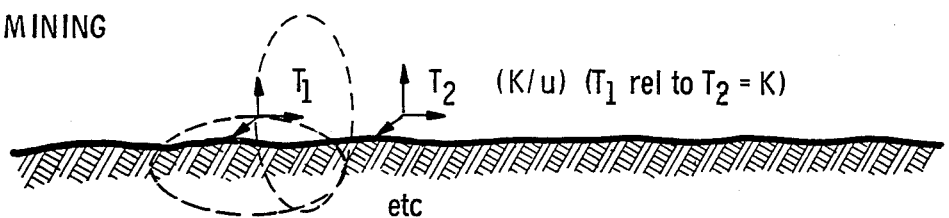
Fig_10
PLURAL SINGLE AXIS TRANSMITTERS & ONE THREE AXES RECEIVER
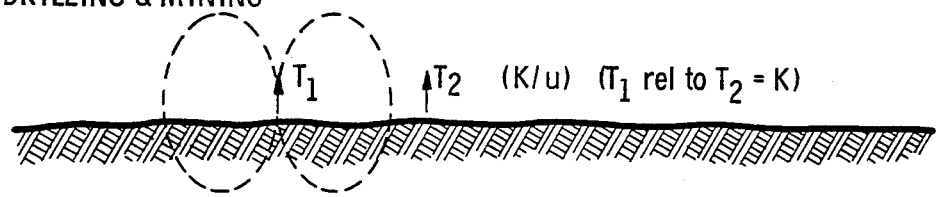
Fig_11
TWO AXES TRANSMITTER AND A SINGLE THREE AXES RECEIVER
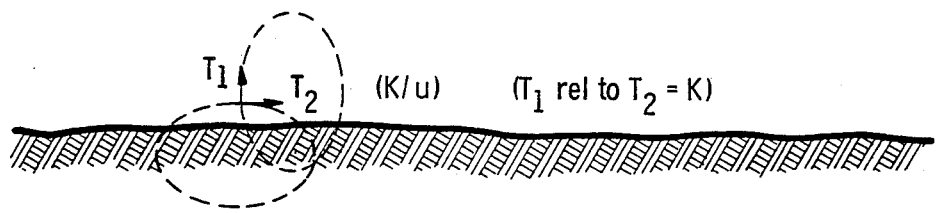
Fig_12

ONE SINGLE AXIS TRANSMITTER & ONE THREE AXES RECEIVER
MINING
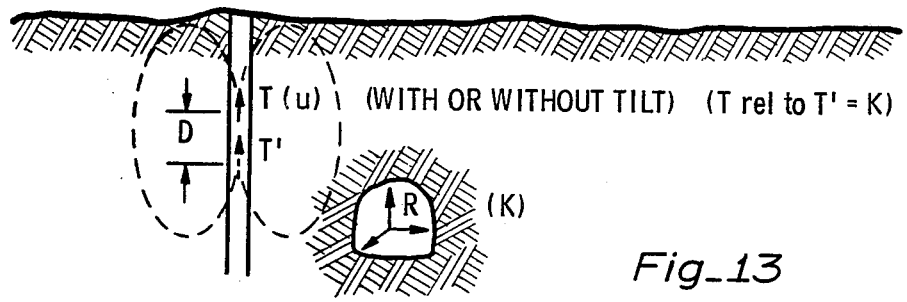
Fig_13
DRILLING
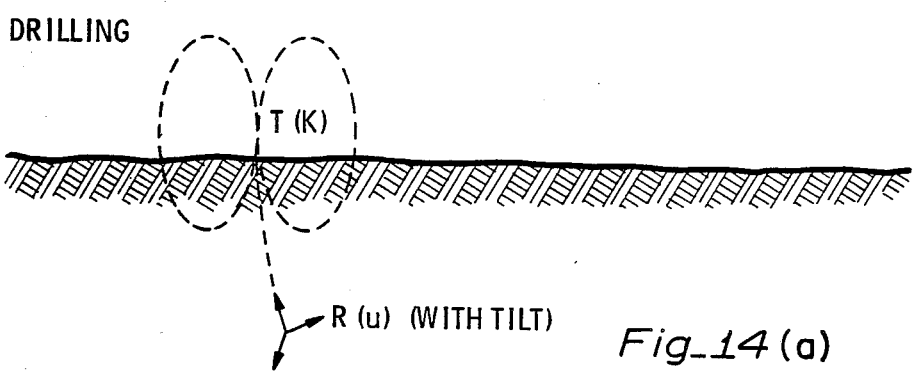
Fig_14(a)
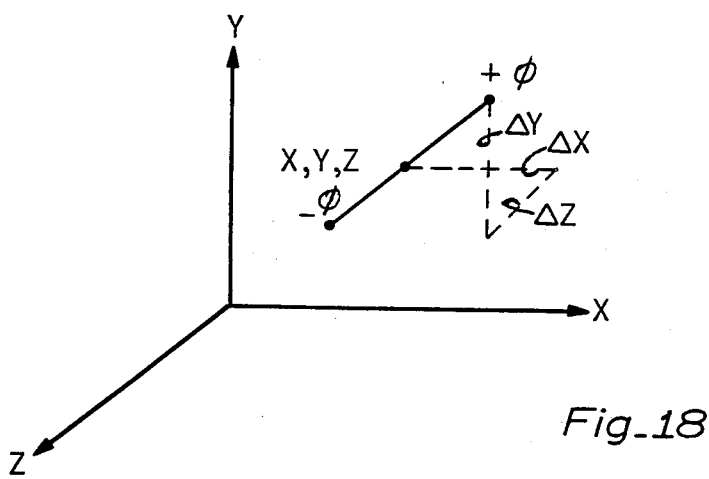
Fig_18

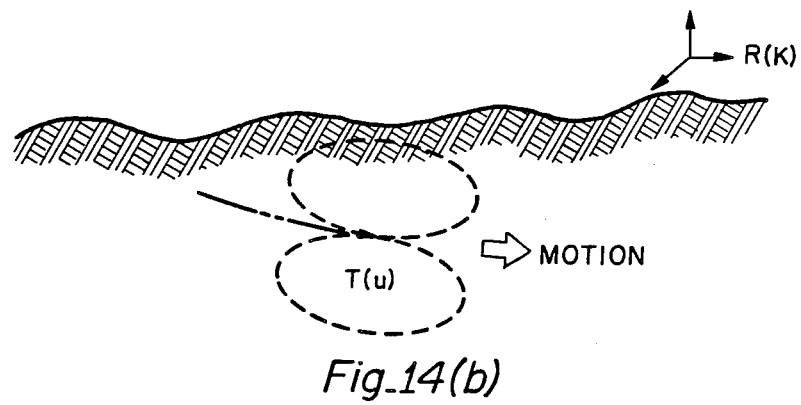
*Fig_14(b)*
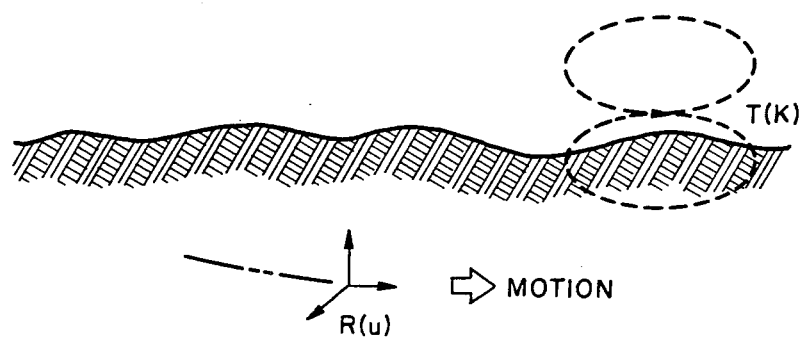
*Fig_14(c)*

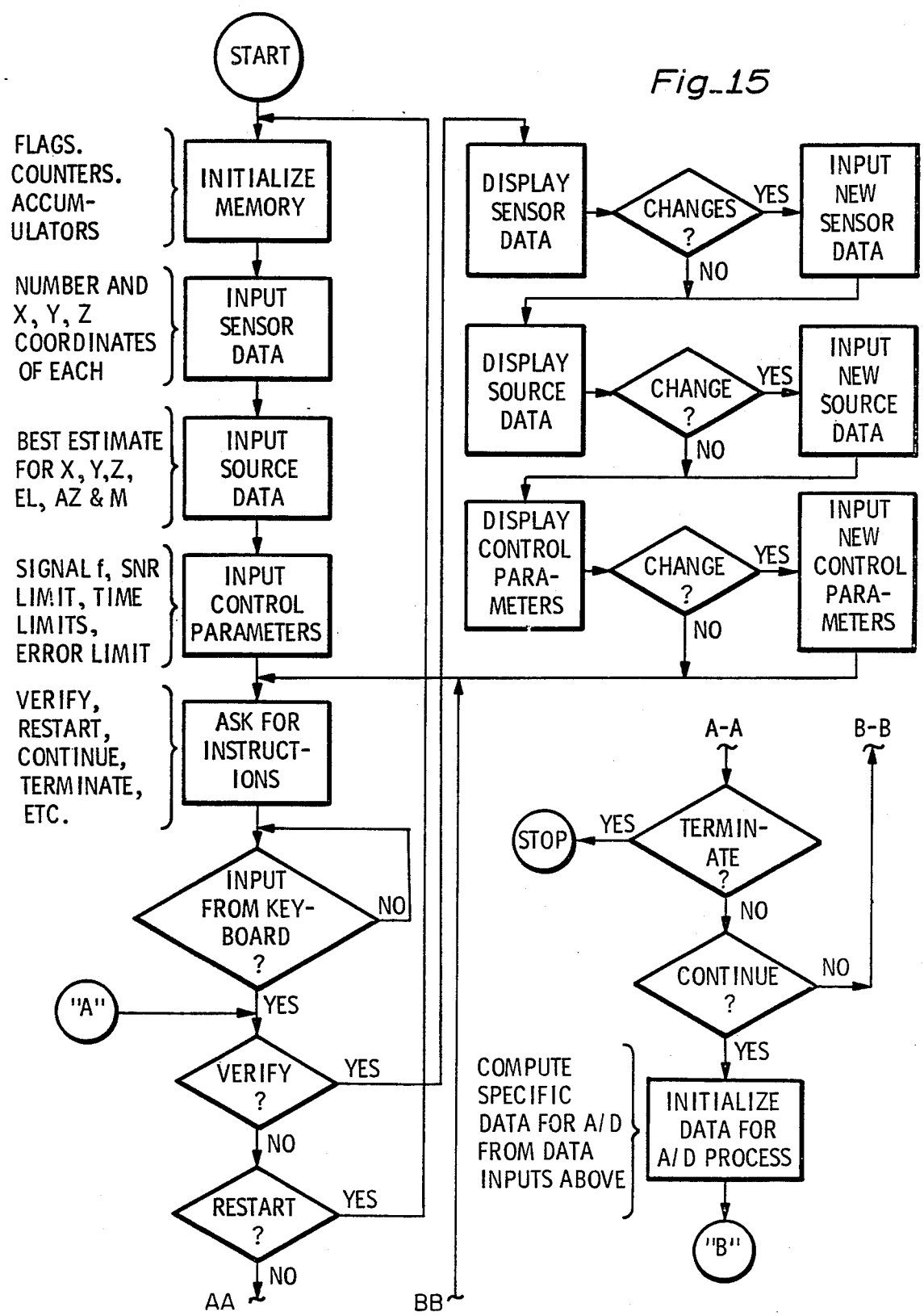
Fig_15

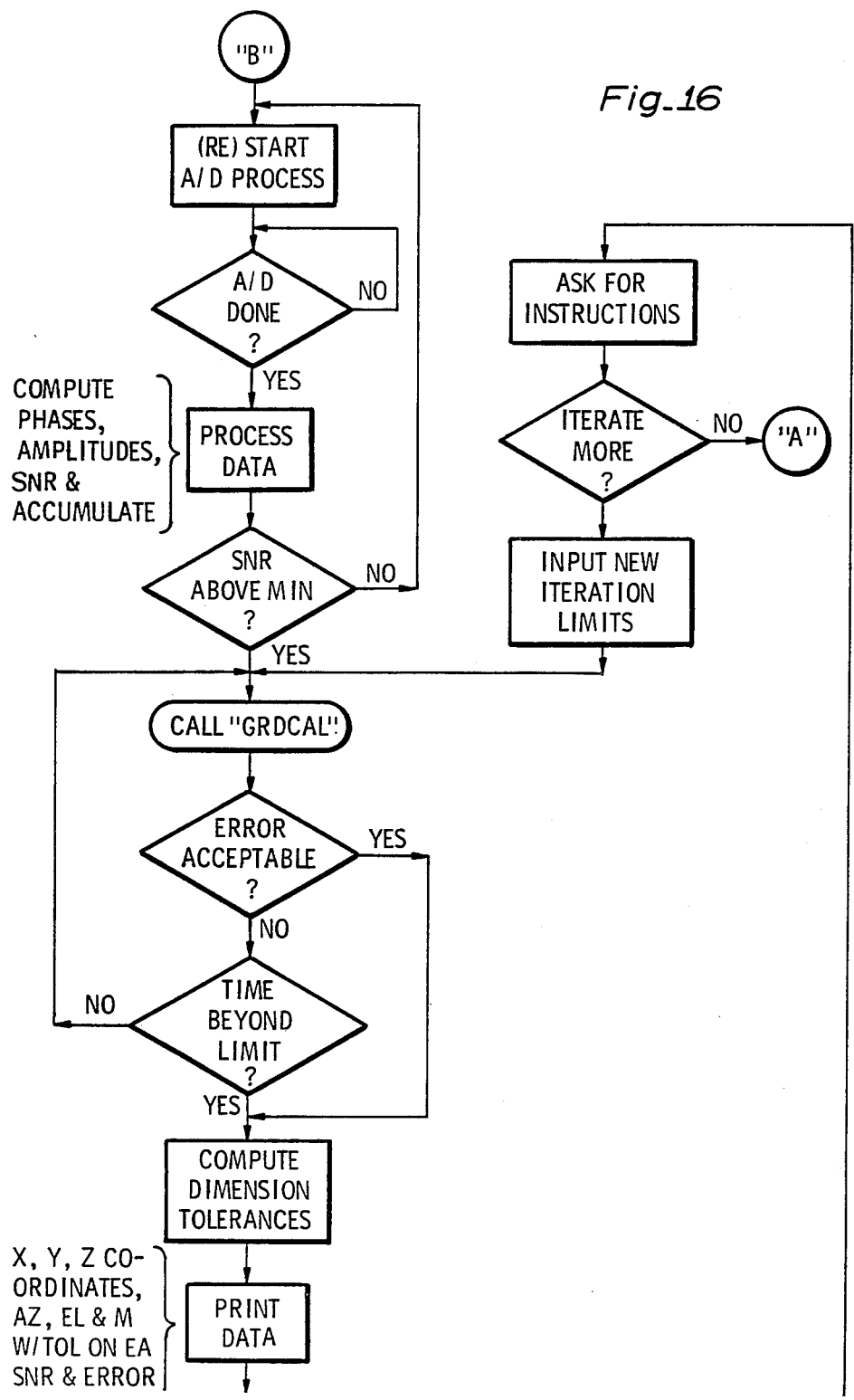
Fig._16

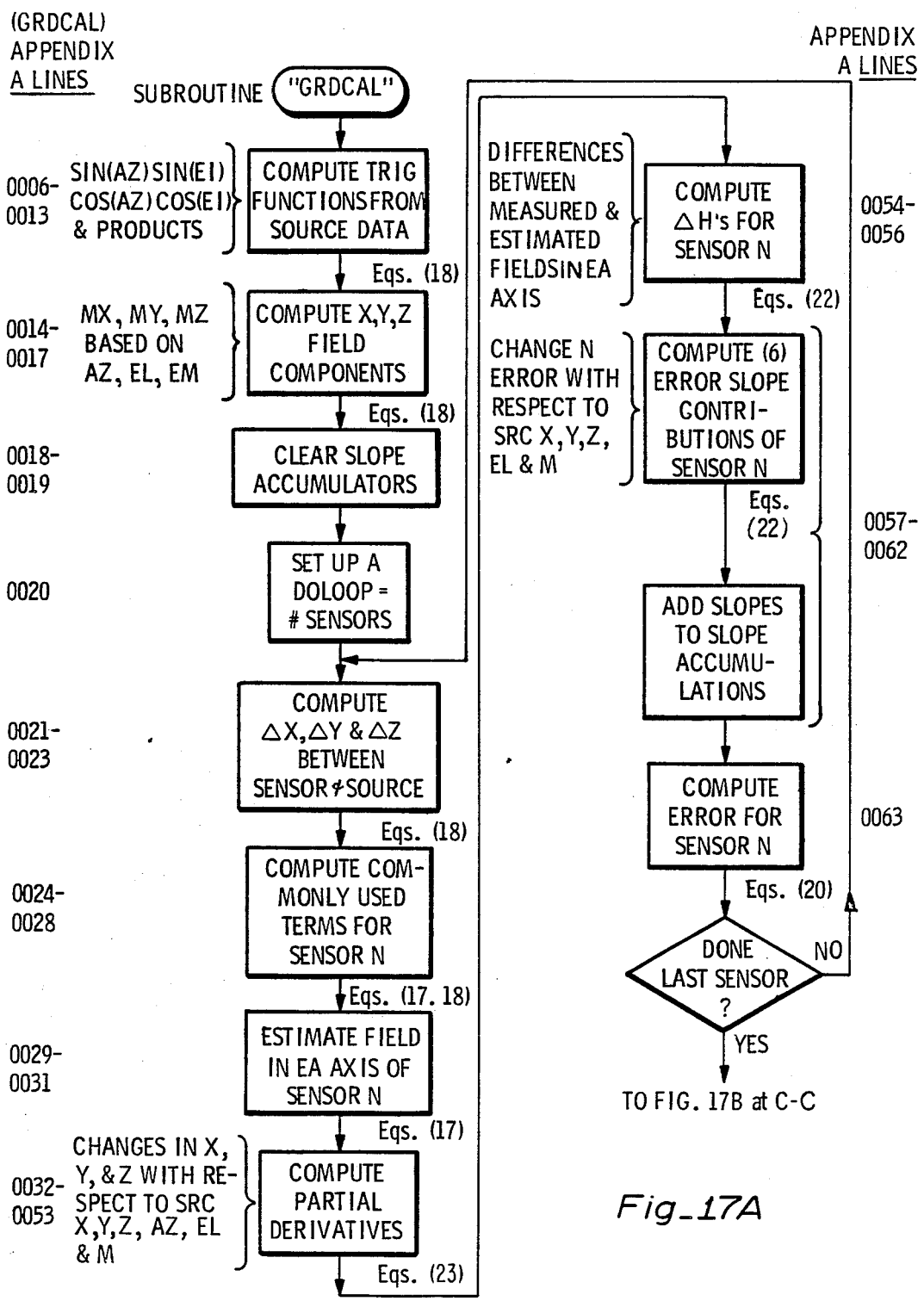
Fig_17A

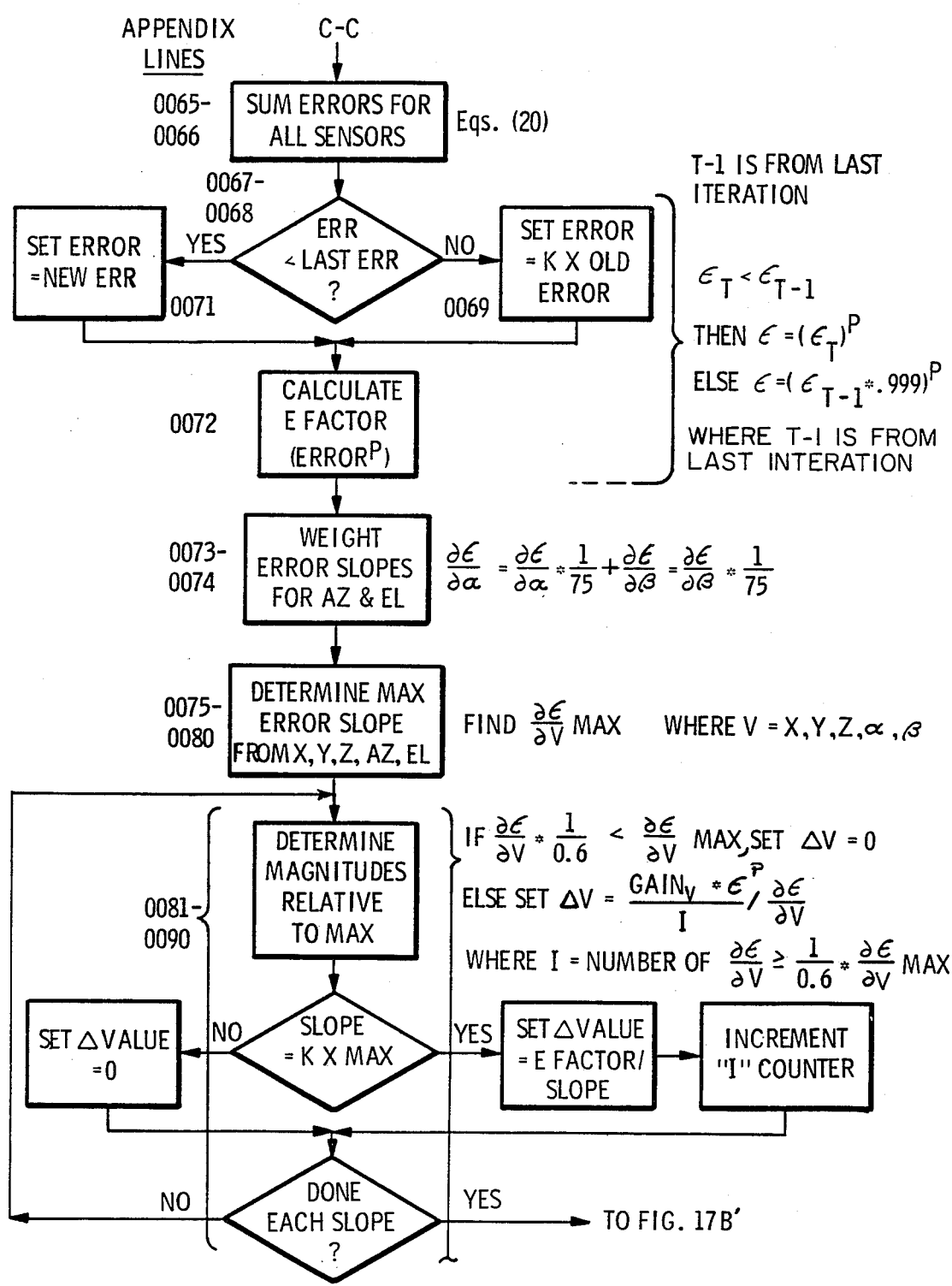
Fig_17B

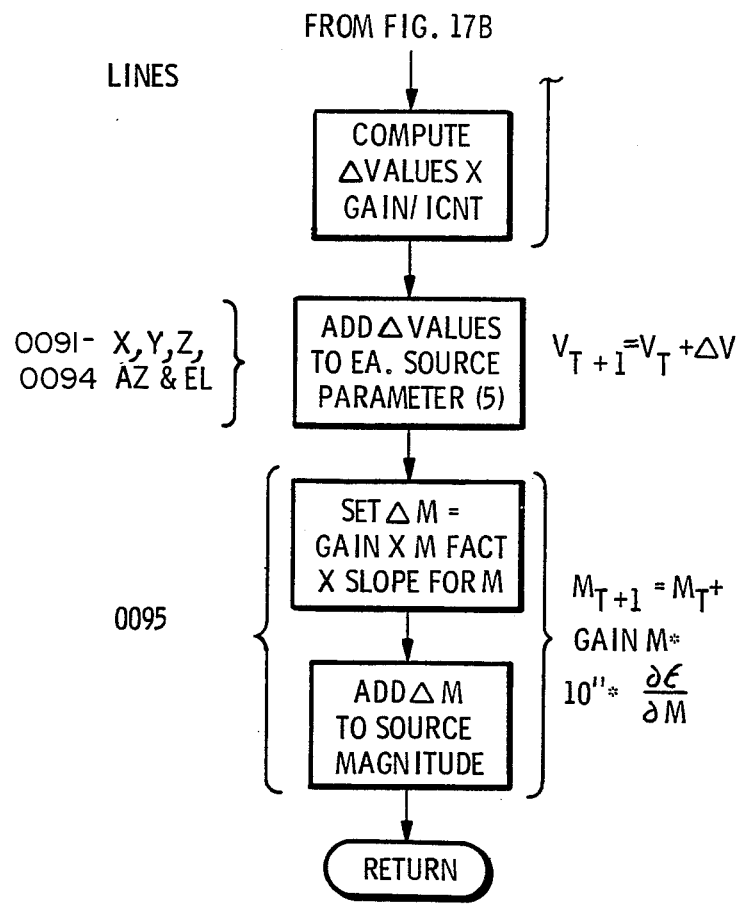
Fig_17B'

METHOD AND APPARATUS EMPLOYING RECEIVED INDEPENDENT MAGNETIC FIELD COMPONENTS OF A TRANSMITTED ALTERNATING MAGNETIC FIELD FOR DETERMINING LOCATION

RELATED CASES

The present application is a continuation-in-part of U.S. Ser. No. 06/257,645 filed 27 April 1981 (now abandoned) which is a continuation-in-part application of parent application U.S. Ser. No. 06/036,017 filed 4 May 1979, now abandoned.

BACKGROUND OF THE INVENTION

The present invention relates in general to method and apparatus for determining relative location of one object relative to another and, more particularly, to a method employing an alternating low frequency magnetic field transmitted from one location and received at another. The received signals are analyzed to determine the relative locations of the transmitting and receiving stations.

DESCRIPTION OF THE PRIOR ART

Heretofore, a number of prior art methods employing one or more low frequency magnetic field transmitters transmitting to one or more receiving stations have been employed for determining the relative location of one of the stations relative to the other. One such prior art method has been utilized for locating a transmitting magnetic dipole antenna operating at a frequency of about 1 kilohertz in a borehole by using a single axis receiver and triangulation methods from within a tunnel. However, the relatively high frequency of 1000 hertz does not permit direct application to cased boreholes and triangulation is not practical in some situations. This method is described in a publication titled, "Electromagnetic Technique for Locating Boreholes", published in 1978 by the U.S. Dept. of the Interior, Bureau of Mines, Report of Investigation 8302.

Another triangulation method for locating a subterranean drill bit transmitter relative to receiving stations on the surface is described in U.S. Pat. No. 3,828,867 issued Aug. 13, 1974. The problem with this method is that it requires a radiated field which is very difficult to do at low frequencies. If quasistatic fields are employed the location calculation is only correct if the dipole transmitting antenna is exactly vertical and at the surface. The dip angle measured is the compliment of the magnetic field dip, not the direction to the dipole. This gives a correct answer only for the trivial case of the transmitting dipole being at the surface and exactly vertical.

Another method for locating the transmitting station uses a two or three-axis transmitter which transmits to a two or three-axis receiver at an unknown location. The received signals are analyzed to give information on bearing but not range unless the transmitter moment is precisely known. This system is disclosed in U.S. Pat. No. 3,868,565 issued Feb. 25, 1975 and U.S. Pat. No. 3,983,474 issued Sept. 28, 1976. This method is not feasible for many applications because the antenna dimensions for a practical three-axis transmitter are too large and the power requirements are too large for most borehole applications.

Another method using a three-axis transmitting antenna and a three-axis receiving antenna is disclosed in U.S. Pat. No. 4,054,881 issued Oct. 18, 1977. Unlike the similar methods cited above, this method can operate open loop but the phase and amplitude of the transmitted signal must be known and communicated to the receiver by modulating the signal. This requires the use of relatively higher operating frequencies than are generally desirable in underground location applications and performance will be severly limited by unknown attenuation and inhomogeneities in the conducting earth. Another problem is that nine measured parameters and other known parameters are required to determine the relative position and orientation of the three-axis transmitting and three-axis receiving antennas and a three-axis transmitter is not practical in a borehole.

Another prior art system requires a relatively large linear scale dipole and quadrupole antenna loop operating with a three-axis receiving station located in a subterranean burrowing device. Such a system is disclosed in U.S. Pat. No. 3,529,682 issued Sept. 22, 1970. The problem with this system is that the large scale transmitting antenna loops are always cumbersome to deploy and impossible to use in many applications such as underground or where obstacles are present. The single three-axis receiver located in the burrowing device is subject to considerable electric noise induced by motion in the earth's field caused by vibration.

The location method described in U.S. Pat. No. 3,900,878 uses two meter diameter horizontal surface loop antennas to sense the magnetic field signals generated by an underground horizontal loop for mine rescue. The phase of the signals detected by portable and reference receivers are compared to determine the point of maximum phase lead which theoretically occurs directly over the underground transmitter. The accuracy will be limited by field scattering in an inhomogeneous medium at the relatively high frequency used for the communication function. Further limitations are an orthogonal relationship between the transmitting and receiving loops is required and range cannot be determined unless the transmitter moment is known and the signal amplitude is measured by a different method. Therefore, this method will provide the correct horizontal location, but not the depth, only if the transmitter moment is exactly vertical and the geology is horizontally stratified.

Other conventional underground survey methods, particularly in borehole work, typically employ gyroscopes or measurements of the earth's magnetic and gravity field at any given moment. Position is then determined by complicated approximations to give the integral over the path which generally leads to a significant cumulative error. Also, the gyroscopes, in particular, are subject to significant instrument drift and cannot withstand high levels of shock and vibration. The earth magnetic field measurements are strongly affected by local anomalies, such as drill pipes, railroad tracks, etc., which introduce errors. In underground mining, conventional optical survey methods are usually used but large cumulative errors typically result due to difficulties in transferring reference positions from the surface and, often, the inability to close surveys underground.

It is also known from the prior art to employ a low frequency solenoid transmitting antenna preferably with a ferromagnetic core which is particularly suited for use in subterranean locations such as boreholes, tunnels and the like and operating with receiving antennas located on the surface. Such a system is disclosed in U.S. Pat. No. 3,967,201 issued June 29, 1976 for communication, but does not address location.

There is a need to determine the relative position and/or orientation of remote objects under conditions (e.g., underground) where either the transmitter or receiver must be constrained to a single axis device. Also, there is a need to operate at frequencies as low as 1 Hz to minimize the magnetic field distortion due to various ferromagnetic and conductive anomolies resulting from man-made or geological structures. Further, there is a need to determine the position and/or orientation information with a minimum amount of data and without precise knowledge of the magnitude and phase of the transmitted signal or the attenuation information with a minimum amount of data and without precise knowledge of the magnitude and phase of the transmitted signal or the attenuation in the medium between it and the receiver and without the need to move some device in some cases.

SUMMARY OF THE PRESENT INVENTION

The principal object of the present invention is the provision of an improved method and apparatus employing the transmission of alternating magnetic fields through the earth for determining the previously unknown position and orientation of a remote object. The restrictions placed on underground instrumentation by the environment and the confines of boreholes make the following cases the preferred embodiments:

1. Location of a single-axis transmitter, which could be run in a drill string behind the bit and operate reliably while actually drilling. Subclasses of this type of system are:

1.1 Use of three or more triaxial sensors at known locations and orientation to completely determine the transmitter's position and orientation without use of additional information.

1.2 Use of two triaxial sensors as in 1.1 which are adequate for complete determination when certain known ambiguous geometries are avoided.

1.3 Use of various arrays of one, two, and/or three-axis sensors, the total number of sensor elements required being determined to avoid ambiguities in the particular geometry involved. At least six elements (sensor axis) are required.

1.4 Use of less than the number of sensor elements required for unambiguous determination of transmitter position and orientation, plus enough additional information such as transmitter moment, inclination, azimuth and/or distance in the hole, to complete the solution.

2. Location of a triaxial sensor in a borehole with respect to two spaced single-axis transmitting loops on the surface or sea floor.

3. Location of a single-axis transmitter in a borehole with respect to a three-axis sensor by moving the transmitter through the borehole in known increments.

4. Location of a single-axis moving transmitter in a borehole with respect to a three-axis sensor, where the transmitter is attached to a steerable drill moving nominally toward the sensor, and the location measurements are used to guide the drill on a prescribed course.

In one feature of the present invention, alternating magnetic fields transmitted from a transmitter station or stations are received at a receiving station or stations to derive a set of signals containing a plurality of magnetic field components specifying the total complex vector of the a.c. magnetic vector field or fields being received. These received field components are quantified and employed either in a graphical method or in a method of successive approximations to determine the relative locations of the transmitting station or stations relative to the receiving stations.

In another feature of the present invention, the transmitting station employs a single axis magnetic dipole transmitting antenna and the receiving station uses a three-axis receiver in a known orientation and at a known location and is employed for determining the relative position of the transmitting station relative to the receiving station. This arrangement is particularly suited for locating a remote or buried object at the transmitting station.

In another feature of the present invention, the location of a remote or buried receiving station or stations is determined by locating the transmitting station at a known orientation and at a known location and measuring the resulting a.c. magnetic field at the receiving station or stations to derive a relative location of the receiving station or stations relative to the transmitting station.

In another feature of the present invention, one single axis transmitter of unknown magnetic moment or orientation is located by employing a pair of three-axis magnetic field receivers at a pair of known receiver stations. A third known receiver station can be added if the transmitter is expected to be near a locus that produces ambiguities when only two receiver stations are used. This method is particularly useful for borehole surveying, river crossing, drill guidance, pipeline tunnelling guidance, mine surveying and shaft location.

In another feature of the present invention, the location of one single axis receiver is determined relative to the position of two three-axis transmitter stations by analyzing the received a.c. magnetic field and calculating the relative location of the transmitting and receiving stations. This method is particularly suited for location of a trapped miner, who can deploy a wire loop receiving antenna (of unknown size or axis orientation, due to the tunnel size restrictions, floor irregularites, rock falls, etc.). The receiving antenna is connected to a battery powered electronic system capable of receiving and measuring the received field signals and relaying the information to the surface.

In another feature of the present invention, a single axis transmitting station is moved to two or more related but unknown locations, i.e., lowered in known steps down a borehole, and a single three-axis receiving station is employed at a known location for analyzing the received signals and determining the relative location of the transmitting station relative to the receiving location.

In another feature of the present invention, a pair of single axis transmitters at transmitting stations of known location, orientation and relative moment are employed for transmitting low frequency magnetic fields to a three-axis receiving station of unknown location or orientation. The received signals are analyzed to determine the position of the receiving station relative to the known transmitting stations. This scheme is applicable to surveying of deep boreholes by deploying two separated transmitting loops on the surface, or sea floor, capable of producing the very large magnetic moment needed for deep penetration.

In another feature of the present invention, a single-axis transmitting station of known location, orientation and moment is employed for transmitting alternating magnetic field signals to a three-axis receiver station of known orientation and unknown location. The received signals are analyzed to determine the location of the receiving station relative to the transmitting station. This method is particularly useful for deep hole surveying and the orientation of the receiving antenna is conveniently obtained by including a tiltmeter and magnetic compass at the receiving station. This system is particularly useful by using all available real estate for one large transmitting loop for extremely deep holes or restricted access on the surface.

In another feature of the present invention, a two-axis transmitting station of known location and magnetic moment is employed for transmitting an alternating magnetic field to a three-axis receiving station of unknown location or orientation. The received signals are analyzed to determine the relative location of the three-axis receiver sensor, or knowing its location the orientation of the receiver sensor.

In another feature of the present invention, a quasi-static alternating magnetic field or fields is transmitted from essentially only a single axis transmitter movable along a course. A three-axis receiver receives the transmitted magnetic field and a steering signal is derived from the received fields for guiding the course of the transmitter relative to the receiver station.

In another feature of the present invention, quasi-static alternating magnetic fields are transmitted from a plurality of single axis colinear transmitter stations of known separation. The transmitted fields are received at essentially only a single three-axis receiver station of known location and known orientation relative to the transmitter axes. The location of the transmitting stations relative to the receiver station is derived from the received magnetic fields.

Other features and advantages of the present invention will become apparent upon a perusal of the following specification taken in connection with the accompanying drawings wherein:

BRIEF DESCRIPTION OF THE DRAWINGS

FIG. 1 is a schematic line diagram including an enlarged detail portion depicting certain parameters associated with a transmitter and receiver location system employing features of the present invention, FIG. 2 is a plot of received normalized vertical magnetic field intensity Hv vs distance in the Z direction of FIG. 1, FIG. 3 is a plot similar to that of FIG. 2 depicting the horizontal magnetic field component, FIG. 4 is a cartesian coordinate plot depicting a magnetic moment M and specifying certain parameters of the resulting magnetic field, FIG. 5 is a schematic block diagram of a magnetic field transmitter (source) incorporating features of the present invention, FIG. 6 is a schematic block diagram of a magnetic field receiver (sensor) incorporating features of the present invention, FIGS. 7-14 (a-c) are schematic line diagrams depicting various arrangements of transmitter and receiver stations for practicing the present invention, FIG. 15 is a computer program logic flow diagram depicting the logic of a portion of a program employed for practicing the present invention, FIG. 16 is a computer program logic flow diagram depicting the logic for a second portion of a program used in practicing the present invention, FIGS. 17A-17B is a computer program logic flow diagram depicting the logic for a gradient calculation subroutine of a program used in practicing the present invention, and FIG. 18 is a diagram similar to that of FIG. 4 depicting a two pole flux source.

DESCRIPTION OF THE PREFERRED EMBODIMENTS THEORETICAL CONSIDERATIONS

By making appropriate measurements of an electromagnetic field, it is possible to determine the source. In an essentially lossless environment, like the atmosphere, the transmitter location may be determined from coded or uncoded propagating electromagnetic waves. However, in a conducting medium, such as the earth or water, rapid exponential signal attenuation results from energy dissipated through currents generated in the medium. It has been shown in the aforecited U.S. Pat. No. 3,967,201 that low frequency magnetic fields are a very effective means for communicating in a lossy medium. If appropriate total complex vector measurements are made of these magnetic fields, the relative position and orientation of the transmitter and receiver can be calculated.

For the geometry illustrated in FIG. 1, the radial and tangential magnetic field strength (Hr and H0 in polar coordinates) components at the receiver, which result from a small magnetic dipole antenna, with a moment m, operating through a steel casing, with an attenuation A, located in the earth, with absorption parameter $\Gamma$, are as follows:

$$H_r = (Am/2\pi r^3)\Gamma_r \cos\theta \qquad \text{Eq. (1)}$$

$$H_\theta = (Am/4\pi r^3)\Gamma_\theta \sin\theta \qquad \text{Eq. (2)}$$

where $$\Gamma_r = \left[1 + \frac{r}{\delta} + j\frac{r}{\delta}\right] e^{-r/\delta}$$

and $$\Gamma_\theta = \left[1 + \frac{r}{\delta} + j\left(\frac{r}{\delta} + 2\frac{r^2}{\delta^2}\right)\right] e^{-r/\delta}$$

and the skin depth $\delta = (\pi f \mu_o \sigma)^{-\frac{1}{2}}$; in MKS units $\mu_o = 4\pi \times 10^{-7} H/m$.

In the location and navigation cases that are considered here, low frequencies F, (below 1 kHz and generally 1-100 Hz) are typically used so that for typical values of earth's conductivity, (0.001-0.1 S/m) the ranges, r, of interest (less than a few 1000 m) are significantly less than the earth's skin depth, $\delta$, so the absorption in the earth is negligible. Thus, the expressions reduce to those for simple quasi-static magnetic fields, or $\Gamma_r = \Gamma_\theta = 1$.

The presence of an intervening metal structure, such as steel casing, can result in appreciable attenuation A. It can be shown that the effect is equivalent to that of a source with the same location but smaller amplitude than without the casing. Because of geometrical considerations, the relative location of the transmitter(s) and receiver(s) can be calculated without any knowledge of the attenuation, or even the dipole moment magnitude, if it is uniform over the paths of interest. Multiple frequencies may be used to resolve the attenuation in those cases where attenuation is nonuniform. By using relatively low operating frequencies, the attenuation can be minimized so that it does not seriously deteriorate system performance.

Field distortion, or scattering, caused by eddy currents induced in conductivity anomolies, such as metal structures, or nonhomogeneous or a stratified medium is an effect encountered as the operating frequency is increased. The location errors that will be produced by this effect are very difficult to predict because of the complexities and possible variations involved. However, these errors are generally small when the signal wavelengths are much greater than the size of the inhomogeneities in the local region. Location errors can also increase as frequency is reduced toward dc because of ferromagnetic concentration effects in nearby steel structures such as rails. However, many common structural steels appear diamagnetic in the presence of even low frequency alternating fields. It has been demonstrated that the location errors are very small, in at least the 2–10 Hz frequency range, for the actual conductors found in mine and drilling situations.

The use of magnetic field measurements to determine physical location is limited by noise introduced from electrical and mechanical sources. Atmospheric magnetic field noise caused by extraterrestial sources and worldwide thunderstorm activity is the basic, but not necessarily the largest component. A portion of this noise may be described by the simple empirical model $H_{no}^2 \simeq 10^{-11}/f(A^2/m^2Hz)$ which is the upper bound of noise levels reported by Maxwell and Stone in the IEEE Transactions on Antennas and Propagation, Volume AP-11, No. 3, pp. 339-343, May 1963. This model is valid for horizontal magnetic fields from about 2 to 1000 Hz, in midlatitudes for all seasons, and has been used for many years to optimize and predict the performance of underground communication and location systems. Although the model makes no allowance for the effects of local thunderstorms, if impulsive noise processing is incorporated in the receiver, the model still represents a reasonable worst case and becomes conservative most of the time. This is partially due to the fact, shown by Evans and Griffiths in the IEEE Transactions on Communications, Volume COM-22, No. 4, April 1974, that local thunderstom activity raises the impulsiveness as well as the mean level of the noise, rendering it more susceptible to processing.

To be more accurate, the magnetospheric or "micropulsation" noise that is generally predominate only below 2 Hz, should be added to the atmospheric noise model. However, magnetospheric noise, even though it rises very rapidly below 2 Hz, is only of concern in very special cases since the optimum frequency for most location problems is generally above this value. Also, the low-frequency end of the "1/f" model should be modified to incorporate the Schumann resonances. As illustrated by Evans and Griffiths in the reference cited above, the first three modal peaks at 8, 14, and 20 Hz would be somewhat above the "1/f" model, while the troughs at 5, 11, and 17 Hz would be well below it. It should also be noted that the vertical component of noise is generally considerably smaller than the horizontal component, typically by 10 to 20 dB. Thus, the application of frequency selection, impulse noise processing, and possibly long baseline cancellation, might lower the "1/f" model by 20 dB.

Power line transient noise is a major factor in most industrial applications. For lack of available measurements, this has been modeled by assuming that noise outside the immediate vicinity of 60 Hz is due to an ensemble of random-sized steps in load current occurring at random times. This source drives a magnetic line dipole, representing the infinitely long, narrow loop of circulating current in the offending power line. The resultant magnetic field varies inversely as the square of distance from the line, and has the spectrum of a delta function at $\omega_o = 2\pi \times 60$ plus a noise continuum of spectral density $H^2(\omega) = K(\omega^2 + \omega_o^2)/(\omega^2 - \omega_o^2)$. To be complete a similar term should be added for each harmonic.

The remaining significant noise component, that due to random vibration of the receiving antenna (in rotation) in the earth's field, must be considered but is not felt to be a serious problem. Although no attempt has been made to model it, it has been observed and successfully combatted in the field. Even with a very crude system, measurements within a few hundred feet of an operating oil well drill rig showed total noise levels (atmospheric plus power line plus motional) comparable to the "1/f" model in the 1 to 30 Hz region when the antenna was shielded from the wind. Proper design of a shock-mounted, wind shielded magnetic cored search coil array, or simply a very large horizontal loop for vertical field sensing, should avoid motional noise contamination due to wind and vibration. The problem is much more difficult when dealing with measurements from moving platforms such as aircraft. However, an adaptive processing technique has been devised which can be used to compensate for small rotations in such situations.

The location errors are a function of the signal-to-noise ratio (SNR) of the magnetic field strength measurements and the field distortions caused by inhomogeneous conditions. In general, the preferred frequency for location in such that the earth's skin depth is on the order of or greater than the operating path length at the maximum operating frequency to minimize attenuation and distortion effects due to the conducting medium. As the operating frequency is increased significantly above this point, the attenuation in the conducting earth increases rapidly. Although the most common noise conditions tend to decrease with increasing frequency, the rate is lower than the signal reduction. Since the location accuracy is roughly proportional to the SNR, it will degrade in some proportion of the frequency increase for a given transmitting and receiving system (e.g., if a SNR=40 dB results in a 1% location error at f, the SNR might be $\leq 20$ dB at $10 \times f$, which would result in an error $>10\%$).

For communication through the earth, the optimum frequency is essentially that which maximizes the ratio of received signal-to-noise density for the given (or assumed) profile of transmitter moment vs. frequency, propagation loss, and noise model as shown in the aforecited Pat. No. 3,967,201. For location, accuracy is constrained by the same signal-to-noise ratio as for communication, although a much higher value (approximately 40 dB compared to approximately 10 dB) is required. For homogenous earth, therefore, the same optimum frequency will result. In the real world, inhomogeneities and scattering obstacles could modify this choice in a very complicated manner. For instance, in the presence of inhomogeneous formations and nonmagnetic obstacles, the optimum frequency will always be reduced to a value where the unpredictable scattering is comparable to the additive noise. On the other hand, if magnetic obstacles are present, particularly long, thin rods, the frequency may have to be increased to reduce scattering.

For location, the optimum frequency will depend on the magnitude of the transmitting moment as well as on the noise spectrum, since scattering "noise" is multiplicative rather than additive. The optimum frequency for scattering alone may not occur at zero frequency. In practice, however, a frequency of a few hertz is sufficient to greatly reduce ferromagnetic concentration effects, at least in the mines where this technique has been employed.

The specific operating frequency is chosen to minimize the effects of the ambient noise, the conducting medium and inhomogeneities in the medium.

SIGNAL PROCESSING

Any signal acquisition method may be used which minimizes noise effects and produces an accurate measurement of the signed signal amplitude. The exact signal phase angle, as distinct from polarity, is often determined to achieve the advantages of synchronous detection but it is not necessary for the calculation of location. One example of a cross-correlation method is described in the following but there are many others.

Suitable processing of noisy data should be employed in order to achieve satisfactory location accuracies for practical applications.

The data processing steps for the problem can be divided into two general categories:
1. from samples of the magnetic field sensor outputs, determine estimates of the amplitude and phase of the sinusoidal field at each of the sensors;
2. given these estimates of the amplitude and phase of each component of the magnetic field, estimate the position, orientation, and source strength of the transmitting antenna.

This discussion considers these problems and presents the derivation of algorithms that will provide the desired estimates.

SIGNAL AMPLITUDE AND PHASE

For purposes of this derivation only one signal will be considered; the process is repeated identically for the remaining five or more signals to be processed.

The signal to be processed is provided as a sequence of amplitude samples taken at times $t_n$ and can be represented in the form $$v(t_n) = A \sin(\omega t_n + \phi) + n(t_n) \quad \text{Eq. (3)}$$

where
$v(t_n)$ = the sample value at time $t_n$
$A \sin(\omega t_n + \phi)$ = value of the useful signal at $t_n$
$n(t_n)$ = additive noise value at $t_n$
$\phi$ = phase of desired signal with respect to arbitrary time epoch established by the sampling
$\omega$ = signal frequency—presumed known.

From these amplitude samples, an estimate for the two parameters $\hat{A}$ and $\hat{\phi}$ can be obtained. This can be done by fitting a sinusoid to the samples, and determining the sinusoid parameters that lead to a minimum squared error fit. (This process is equivalent to synchronous detection followed by an integrating filter). The error of the fit for each sample is expressed by $$\epsilon_n = v(t_n) - \hat{A} \sin(\omega t + \hat{\phi}) \quad \text{Eq. (4)}$$

and the total squared error over the sample set of N samples is $$\bar{\epsilon}^2 = \sum_1^N [v(t_n) - \hat{A}\sin(\omega t + \hat{\phi})]^2 \quad \text{Eq. (5)}$$

$$= \sum_1^N v^2(t_n) - 2\hat{A} \sum_1^N v(t_n)\sin(\omega t_n + \hat{\phi}) + \hat{A}^2 \sum_1^N \sin^2(\omega t_n + \hat{\phi})$$

It is the expression that is to be minimized via the selection of $\hat{A}$ and $\hat{\phi}$. At this point some manipulation of the terms in this expression will be helpful. Employing the identity:

$$\sin(a+b) = \sin a \cos b + \cos a \sin b$$

the second term becomes $$-2\hat{A}\left[\cos\hat{\phi} \sum_1^N v(t_n)\sin\omega t_n + \sin\hat{\phi} \sum_1^N v(t_n)\cos\omega t_n\right] \quad \text{Eq. (6)}$$

Note that this has removed the variable to be estimated from within the summations. Next, the third term can be rewritten as $$\hat{A}^2 \sum_1^N [\tfrac{1}{2} - \tfrac{1}{2}\cos 2(\omega t_n + \hat{\phi})] = \frac{N\hat{A}^2}{2} - \frac{\hat{A}^2}{2} \sum_1^N \cos 2(\omega t_n + \hat{\phi}) \quad \text{Eq. (7)}$$

Observe that the second term of Eq. (7) does not depend on the measured data and will be identically zero, independent of $\hat{\phi}$, if (1) the samples are taken uniformly in time, and (2) the sampling rate is a multiple of four times the signal frequency, and (3) N is selected so that samples are taken over an integer number of signal cycles. Since the signal frequency $\omega$ is known, these constraints on the signal sampling are easy to meet.

A second point must be observed about Eq. (7): if it is determined that a particular sample is badly contaminated by noise, then it may do more harm than good to include it in the determination of $\hat{A}$ and $\hat{\phi}$. The only effect on all other terms of the expression for $\bar{\epsilon}^2$ except this last one is that the edited out sample is deleted from the indicated summations (in effect $V(t_n)$ is set to zero for that $t_n$) and the value of N is reduced to reflect the deleted samples. In this case of arbitrarily deleted samples, the last term (the $\Sigma \cos 2(\ )$ term) will no longer be identically zero because it will be mssing the edited out terms. This can be corrected by adding these terms to the deficient summation, at the same time subtracting them from the total expression. Thus, for the case where K data samples are deleted, the expression becomes $$\frac{(N-K)\hat{A}^2}{2} - \frac{\hat{A}^2}{2} \sum_1^N \cos 2(\omega t_n + \hat{\phi}) + \quad \text{Eq. (8)}$$

$$\frac{\hat{A}^2}{2} \sum_1^K \cos 2(\omega t_{n'} + \hat{\phi}) = \frac{(N-K)\hat{A}^2}{2} +$$

$$\frac{\hat{A}^2}{2} \sum_1^K \cos 2(\omega t_{n'} + \hat{\phi}) = \frac{(N-K)\hat{A}^2}{2} +$$

-continued $$\frac{\hat{A}^2}{2}\left[\cos2\hat{\phi}\sum_1^K\cos2\omega t_n' - \sin2\hat{\phi}\sum_1^K\sin2\omega t_n'\right]$$

where $t_n$ are those times when the data samples are deleted.

$$\bar{\epsilon}^2 = \sum_1^{N-K} v^2(t_n) - 2\hat{A}\left[\cos\hat{\phi}\sum_1^{N-K} v(t_n)\sin\omega t_n + \sin\hat{\phi}\sum_1^{N-K} v(t_n)\cos\omega t_n\right] + \frac{(N-K)\hat{A}^2}{2} + \quad \text{Eq. (9)}$$

$$\frac{\hat{A}^2}{2}\left[\cos2\hat{\phi}\sum_1^K\cos2\omega t_n' - \sin2\hat{\phi}\sum_1^K\sin2\omega t_n'\right]$$

Written in this form, the two parameters we are to determine, $\hat{A}$ and $\hat{\phi}$, are not contained in any of the summations involving the measured data. Therefore, to simplify the remaining discussion, define the following $$a = \sum_1^{N-K} v(t_n)\cos\omega t_n \quad c = \sum_1^K \cos2\omega t_n' \quad \text{Eqs. (10)}$$

$$b = \sum_1^{N-K} v(t_n)\sin\omega t_n \quad d = \sum_1^K \sin2\omega t_n'$$

$$f = \sum_1^{N-K} v^2(t_n)$$

then $$\bar{\epsilon}^2 = f - 2\hat{A}(b\cos\hat{\phi} + a\sin\hat{\phi}) + (\hat{A}^2/2)[(N-K) + c\cos2\hat{\phi} - d\sin2\hat{\phi}]$$

and $$\partial\bar{\epsilon}^2/\partial\hat{A} = -2(b\cos\hat{\phi} + a\sin\hat{\phi}) + \hat{A}[(N-K) + c\cos2\hat{\phi} - d\sin2\hat{\phi}]$$

$$\partial\bar{\epsilon}^2/\partial\hat{\phi} = 2\hat{A}\,b\sin\hat{\phi} - 2\hat{A}\,a\cos\hat{\phi} - \hat{A}^2 c\sin2\hat{\phi} - \hat{A}^2 d\cos2\hat{\phi}$$

and setting these expressions each to zero yields $$A = \frac{+2(b\cos\hat{\phi} + a\sin\hat{\phi})}{(N-K) + c\cos2\hat{\phi} - d\sin2\hat{\phi}}$$

and $$2(b\sin\hat{\phi} - a\cos\hat{\phi}) = \hat{A}(c\sin2\hat{\phi} + d\cos2\hat{\phi})$$

Substituting the expression for $\hat{A}$ into this latter equation leads to $$b\sin\hat{\phi} - a\cos\hat{\phi} = \frac{(b\cos\hat{\phi} + a\sin\hat{\phi})(c\sin2\hat{\phi} + d\cos2\hat{\phi})}{(N-K) + c\cos2\hat{\phi} - d\sin2\hat{\phi}}$$

Multiplying these expressions and collecting terms leads to the equation $$[-b(N-K) - ad + bc]\sin\hat{\phi}\cos\hat{\phi} = -[a(N-K) + ac + bd]$$

or $$\tan\hat{\phi} = \frac{a(N-K) + ac + bd}{b(N-K) + ad - bc} \quad \text{(Eq. (11))}$$

Note that this editing process should only be used when the signal is much smaller, i.e., 10% of the noise, in the predetection bandwidth. When applied to noise superposed on larger signals, a bias can result which distorts the apparent signal amplitude. However, this is not a problem in practice since noise editing is not generally needed when signals are, for example, larger than 10% of the noise.

A few comments on how the data can be collected for use in these expressions: Since the samples are uniformly spaced in time, the values for $\sin\omega t_n$, $\cos\omega t_n$, $\sin2\omega t_n$ and $\cos2\omega t_n$ can be pre-computed and stored in a table for a priori chosen values of $t_n$. (For example, if 48 samples per cycle are taken, only 12 values need be stored, and the table entered at different points for the sin, cos, and double frequency terms.)

Two data collection approaches are possible (1) Collect and sum into an array of storage registers the samples from corresponding points on each successive sample, and in a second array the number of samples deleted from each sampling point. When the total number of samples (N) have been collected, multiply each sum by its corresponding trig value and sum to obtain the terms a, b, c, d. Alternatively, (2) multiply each sample by the appropriate trig values as the sample is taken, and form the sums a, b, c, d directly. The trade-off is that (1) requires more memory while (2) requires more computing time per sample.

COMPUTATION OF LOCATION AND ORIENTATION

The two general computational categories are:
1. Determination of the locus of a moving object using one single-axis transmitter and one three-axis receiver.
2. Determination of a "fix" of the location and orientation of a stationary object, or the average fix of a slowly moving object during the observation time, using one single-axis transmitter and multiple three-axis receivers on two single-axis transmitters and one three-axis receiver. There are various subcategories in which only a partial solution is of interest.

The algorithms used for the calculations are described below. Although the examples discussed are for the cases of a single-axis transmitter as the unknown, the same algorithms are useful by exchanging moving for stationary elements or exchanging transmitters for receivers.

MOVING TRANSMITTER METHOD

In cases where a transmitter of fixed orientation is moved linearly, or if multiple sensors are placed on a common axis, the a.c. field components observed as a function of the linear displacement of the moving (or multiple) item will always be a linear combination of three basic forms, known as the Anderson functions, regardless of the direction of motion or orientation. Two of these functions, normalized to unit moment and unit distance of closest approach, are illustrated in FIGS. 2 and 3.

The process of computing the transmitter locus from data then reduces to correlating data from each axis with these three functions, for various trials of vector moment and closest approach distance and time (position), until maximum correlations are found. The mechanisms of this process require an initial estimate of all parameters, then iteration of trials varying each of the parameters for a best fit.

A relatively simple solution, employing graphical techniques, can be used with satisfactory results when the transmitter orientation is fairly well known (e.g., hanging in a vertical borehole) and conditions are reasonably uniform. Although the applications of the graphical method are fairly limited, it illustrates the location principles and problems involved. For the cases where the receiver is a leveled three axis vector magnetometer as suggested in FIG. 1, the vertical and horizontal components actually measured are related to the field expression in polar corrdinates by $$H_v = H_r \cos \theta - H_\theta \sin \theta \qquad \text{Eq. (12)}$$

$$= \frac{Am}{4\pi}(2Z^2 - D^2)(Z^2 + D^2)^{-5/2} = H_z$$

$$H_h = H_r \sin \theta + H_\theta \cos \theta \qquad \text{Eq. (13)}$$

$$= \frac{Am}{4\pi} 3ZD(Z^2 + D^2)^{-5/2}$$

$$= H_x \cos \phi + H_y \sin \phi$$

where $Z$ and $D$ are the vertical and horizontal distance, respectively, from the transmitter to receiver and $\phi$ is the angle of the horizontal field with respect to the receiver coordinates.

These expressions have characteristic patterns which are plotted in FIGS. 2 and 3, normalized to the maximum vertical field at $Z=0$ which is defined as the transmitter antenna center elevation equal to the receiver elevation. This illustration assumes that the transmitting antenna is moved to generate the data, but similar results would be achieved if the receiver is moved although alignment accuracy will be more critical.

The direction, or bearing azimuth ($\phi$), of the transmitter locus from the receiver is given directly by the direction of the horizontal field $$\phi = \text{arc tan}(H_y/H_x) \qquad \text{Eq. (14)}$$

This is best evaluated at the horizontal field maximum which occurs when the transmitter is located at $Z = \pm D/2$. Quadrant resolution must be determined by observation of the relative polarity of the three field components with respect to the antenna phase.

The distance $D$, or range, of the transmitter locus from the receiver can be determined in several ways. The value could be obtained from the derivative of the horizontal field at its peak, as inferred above, but the peak is too broad to permit any more than a rough estimate in practice. In those cases where the transmitter can be moved a sufficient distance in the borehole, the range can be determined from the field zeroes, that occur at $Z_A$, $Z_B$, $Z_0$ using the relationships $$D = \pm \left[ \frac{Z_A - Z_B}{\sqrt{2}} \right] = \pm [\sqrt{2}(Z_A - Z_0)] \qquad \text{Eq. (15)}$$

An alternate procedure involves calculation of the horizontal field slope at $Z=0$ when the vertical field zeroes cannot be obtained. In those instances where the borehole does not reach the receiver elevation, it is useful to extrapolate or to use a more involved calculation procedure.

These equations (12-15) are strictly applicable only when the borehole axis, or the path the transmitter follows, is perfectly parallel to the receiver Z axis although reasonable results can be achieved with up to several degrees of misalignment. Also, the simple graphical methods require very good signal-to-noise conditions and an absence of attenuation changes (e.g., due to casing discontinuities) over the transmitter's path to achieve reasonable accuracy.

An iterative calculation procedure can be used to improve the accuracy by correlating data points to find a best fit with the theoretical curve and to automate the entire data reduction process. This method can also be used to solve for the locus of a linear bore of unknown inclination if the transmitter moment and direction remains constant, and a curved bore by assuming it consists of segments of a circular arc. Inclinometers can be used when it is not possible to control the vertical orientation of the transmitter or receiver.

If instead of moving the transmitter in known increments, the received information is used for steering to force the transmitter to remain nearly colinear and nearly on track (as in drilling application), then the locus can be determined from the data after the fact. In this case, the receiver must be located ahead of the transmitter, within the core having an angle of 54.7° with respect to the transmitter axis, to avoid unresolvable ambiguities for steering.

The steering direction to an intercept point at the receiver location can be determined from the ratio of the measured fields, appropriate for the geometry, as suggested by Equation 14. Although some combinations of offset and orientation will cancel at a given range, the process will converge as drilling progresses. If the receiver is offset from the planned locus, but still within the core of unambiguous operation, or a specific steering radius is required, the steering direction to stay on track can be determined by a combination of the received fields and an independent measurement of transmitter inclination and/or azimuth depending on the geometry.

FIELD CALCULATION METHOD

Transmitter location can be determined from calculations using measurements of the total complex vector field from at least two stationary receiver (or transmitter) stations. Although the computations are very involved, particularly when dealing with low quality data, they can readily be done by using integrated circuit microprocessors in equipment that is designed for easy field use.

The method is based on the fact that the vector properties of the magnetic field generated by a dipole transmitter can be used to locate the transmitter directly, without requiring any sort of search pattern. Assuming a rectangular coordinate frame, and a transmitter within that frame located at x, y, z, and generating a magnetic dipole moment with components $m_x$, $m_y$, $m_z$, then the components of the magnetic field vector at any point 1 in the space can be written $$H_{1x} = f_{1x}(x, y, z, m_x, m_y, m_z)$$

$$H_{1y} = f_{1y}(x, y, z, m_x, m_y, m_z)$$

$H_{1z}=f_{1z}(x, y, z, m_x, m_y, m_z)$   Eqs. (16)

where the functions $f_{1x}$, $f_{1y}$, $f_{1z}$ are determined by the source and propagation models chosen.

Measuring (receiving, detecting and quantifying) the magnetic field in two distinct locations or from two sources generates two such sets of equations, resulting in six simultaneous equations in the six unknowns x, y, z, $m_x$, $m_y$, $m_z$. In principle, this set could then be solved to yield not only the position of the transmitting antenna but its orientation and signal strength as well. Because the functions f are highly nonlinear, the six simultaneous equations cannot be solved directly. A number of iterative solution techniques can be used to solve this set of equations that are suitable for use by a programmable calculator. In each case the computation begins with an initial estimate of the solution, which need not be accurate, and then converges toward the correct solution of the given set of equations.

The primary advantage of this approach is that it gives both the location and orientation of the transmitter with a minimum number of measurements. More than two measurements may be desirable under poor conditions in order to minimize uncertainty by doing a best fit analysis or to eliminate ambiguities for certain loci of transmitter position.

One method of calculation is described in the following which is a form of sucessive approximations called the Gradient Projection Method.

As inferred in Equation 1 and 2, a dipole source model of the magnetic field transmitting antenna is often used for computation in applications where the distances to the sensor are large compared to the dimensions of the transmitting antenna. Referring now to FIG. 4, given a magnetic source specified by the six parameters of dipole moment (m) azimuth ($\alpha$), elevation ($\beta$) and position (x,y,z), the components of alternating magnetic field amplitude (H) produced at n locations $P_i(x_i, y_i, z_i)$, expressed in rectilinear coordinates, are $H_{ix}=(1/4\pi r_i^5)\{m_x(2x_I^2-y_I^2-z_I^2)+m_y 3x_I y_I+m_z 3x_I z_I\}=f_{ix}$ $H_{iy}=(1/4\pi r_i^5)\{m_x 3x_I y_I+m_y(2y_I^2-z_I^2-x_I^2)+m_z 3y_I z_I\}=f_{iy}$ $H_{iz}=(1/4\pi r_i^5)\{m_x 3x_I z_I+m_y 3y_I z_I+m_z(2z_I^2-x_I^2-y_I^2)\}=f_{iz}$   Eq. (17)

where $r_i=[x_I^2+y_I^2+z_I^2]^{\frac{1}{2}}$ $x_I=x-x_i, y_I=y-y_i, z_I=z-z_i$ $m_x=m \cos \alpha \cos \beta$ $m_y=m \sin \beta$ $m_z=m \sin \alpha \cos \beta$   Eqs. (18)

Therefore, for the case of $n \geq 2$ sensors there will be 3n equations of the form $H_{ij}=f_{ij}(m, \alpha, \beta, x, y, z)$   Eq. (19)

where
i=1, 2, 3, ... n
j=x, y, z

Note that $f_{ij}$, while all of the same form, will be parametized by $x_i$, $y_i$, $z_i$. If a fit error defined as the sum square error of each component is established at each sensor then $\epsilon = \sum_{1}^{3n} [\hat{H}_{ij} - f_{ij}(m, \alpha, \beta, x, y, z)]^2$   Eq. (20)

where $\hat{H}_{ij}$ is the measured value at the $i^{th}$ sensor in the $j^{th}$ direction and $f_{ij}$ is the predicted value for a given set of six source parameters. (A weighting function can be added to the fit error by multiplying each term of the summation by an arbitrarily selected constant $A_{ij}$.) This can be minimized by simultaneously setting to zero $\partial \epsilon/\partial m = \partial \epsilon/\partial \alpha = \partial \epsilon/\partial \beta = \partial \epsilon/\partial x = \partial \epsilon/\partial y = \partial \epsilon/\partial z = 0$ and solving for m, $\alpha$, $\beta$, x, y, z. This takes the form $\epsilon = \sum_{1}^{3n} [H_{ij}^2 - 2H_{ij}f_{ij} + f_{ij}^2]$   Eq. (21)

$\frac{\partial \epsilon}{\partial v} = -2 \sum_{1}^{3n} (H_{ij} - f_{ij}) \frac{\partial f_{ij}}{\partial v} = b_v$   Eq. (22)

where the V is the variable and similarly for the other 5 variables. If the trial solution for the estimated source location is correct $b_v$ will=0 otherwise it will not. This yields a set of six equations whose solution is known to exist but which may not necessarily be unique. Because they are also highly non-linear, a straight-forward solution of this set of six equations is not possible and an iterative solution is necessary.

The partial derivatives of $f_{ij}$ are of the form $\partial f_{ix}/\partial x=(1/4\pi r_i^5)\{m_x 4x_I+m_y 3y_I+m_z 3z_I\}-(5x_I/r_i^2)f_{ix}$ $\partial f_{ix}/\partial y=(1/4\pi r_i^5)\{-m_x 2y_I+m_y 3x_I\}-(5y_I/r_i^2)f_{ix}$ $\partial f_{ix}/\partial z=(1/4\pi r_i^5)\{-m_x 2z_I+m_z 3x_I\}-(5z_I/r_i^2)f_{ix}$ $\partial f_{ix}/\partial \alpha=1/4\pi r_i^5\{-m \sin \alpha \cos \beta(2x_I^2-y_I^2-z_I^2)+m \cos \alpha \cos \beta \, 3x_I z_I\}$ $\partial f_{ix}/\partial \beta=1/4\pi r_i^5\{-m \cos \alpha \sin \beta(2x_I^2-y_I^2-z_I^2)+m \cos \beta 3x_I y_I - m \sin \alpha \sin \beta 3x_I z_I\}$   Eqs. (23)

$\frac{\partial f_{ix}}{\partial m} = \frac{1}{m} f_{ix}$ and similarly for $f_{iy}$ and $f_{iz}$.

The Gradient Projection method of sucessive approximations is applied directly to the expression for $\epsilon$. Constraints, based on a priori knowledge of where the solution cannot lie, may be incorporated to limit the field of search. The solution begins with a trial solution at the point $\overline{X}=(\hat{m}, \hat{\alpha}, \hat{\beta}, \hat{x}, \hat{y}, \hat{z})$. At this point both the value of $\epsilon(\hat{m}, \hat{\alpha}, \hat{\beta}, \hat{x}, \hat{y}, \hat{z})$ and each of its first partial derivatives $$\frac{\partial \epsilon}{\partial m}\bigg|_{\underline{x}}, \frac{\partial \epsilon}{\partial \alpha}\bigg|_{\underline{x}} \cdots \frac{\partial \epsilon}{\partial z}\bigg|_{\underline{x}} \text{ are evaluated}$$

Unless these first partials are all equal to zero, this implies that changing the variable $\hat{m} \ldots \hat{z}$ of the trial solution will produce a smaller value of $\epsilon$; closer to the desired result of $\epsilon=$ minimum.

The question remains in which direction, and by how much the value of each variable should be changed. The six first partials, when considered as the components of a vector in six dimensional space, constitute the "gradient" vector. This is the vector that is perpendicular to the surface of $\epsilon=\epsilon_{\underline{x}}$ at the point $\underline{X}$, and hence points in the direction of maximum rate of change of the function $\epsilon$ for a change in its independent variables m, $\alpha$, $\beta$, x, y, z. Therefore, an iterative procedure that will force the independent variables to the values corresponding to $\epsilon=$ minimum, is $$m_{n+1} = m_n - k\frac{\partial \epsilon}{\partial m}$$
$$\vdots$$
$$z_{n+1} = z_n - k\frac{\partial \epsilon}{\partial z}$$

Eq. (24)

where the gain parameter k permits control of the convergence and stability of the algorithm. Convergence of the procedure can be detected either by noting that each of the gradient vector components is acceptably close to zero, or by noting that the value of $\epsilon$ is changing by only an infinitesimal amount on each iteration indicating its arrival at its asymptotic value.

State space constraints can be easily incorporated into the gradient projection method: A constraint prohibiting the solution from lying in some area of the state space can be specified in the form of an inequality like $$f_1(m, \alpha, \beta, x, y, z) \leq 0$$

and similarly for additional constraints. Examples might be $m \leq 5000$ or $300 \leq x \leq 500$. These constraints are incorporated into the algorithm as follows: At each step, each constraint inequality is evaluated from the trial solution at that point by answering the question of whether $$f_1(\hat{m}_n, \hat{\alpha}_n \ldots \hat{z}_n) \leq 0$$
$$f_2(\hat{m}_n, \hat{\alpha}_n \ldots \hat{z}_n) \leq 0 \qquad \text{Eq. (25)}$$

For those constraint inequalities that are satisfied, no further action is required. If, however, a constraint inequality is not satisfied, this indicates that the trial solution has moved into a prohibited area.

The procedure then is as follows:
1. Reverse the last iteration to return to an allowed area of state space.
2. Using a very much reduced value of the gain constant k, (say 1%) slowly approach the constraint surface as close as possible.
3. Once the value is as close as possible (in theory right at the point where the constraint equality is satisfied—i.e., lying right on the constraint surface) calculate the projection of the gradient vector tangent to the constraint surface. The next adjustment of the trial solution variables will be determined by this projected gradient rather than the gradient itself.

The projection of the gradient of the function
$$\epsilon(m, \alpha, \beta, x, y, z)$$
that is tangent to the surface
$$f_1(m, \alpha, \beta, x, y, z)=0$$
at the point
$$\underline{X}(\hat{m}, \hat{\alpha}, \hat{\beta}, \hat{x}, \hat{y}, \hat{z})$$
is found as follows:

Denote the gradient of the constraint surface 1 by the column vector $N_1$ $$N_1 = \begin{bmatrix} \frac{\partial f_1}{\partial m} \\ \vdots \\ \frac{\partial f_1}{\partial z} \end{bmatrix}_{\underline{x}}$$

Eq. (26)

and the six by six matrix Q by $$Q=I-N(N^TN)^{-1}N^T \qquad \text{Eq. (27)}$$

where I is the six by six identity matrix and the matrix N is composed of those column vectors $N_i$ corresponding to the constraint surfaces we have hit. (In most cases the matrix N will have only one column corresponding to only one constraint surface.)

The desired gradient projection vector is then given by $$GP = Q \cdot \begin{bmatrix} \frac{\partial \epsilon}{\partial m} \\ \vdots \\ \frac{\partial \epsilon}{\partial z} \end{bmatrix}_{\underline{x}}$$

Eq. (28)

The aforedescribed computational steps are most conveniently performed by a programmed computer.

Referring now to FIG. 18, there is shown an alternative method using two magnetic poles (plus and minus) instead of a dipole transmitter antenna model for computation of location. This method reduces errors at a short range. The model of FIG. 18 and the method of using the two magnetic poles instead of the dipole is described as follows:

Assume a two-pole flux source located symmetrically about the point x, y, z such that the displacement of the + pole from the point is $\Delta x$, $\Delta y$, $\Delta z$. See FIG. 18.

The magnetic flux source is of magnitude $\phi$ (webers) and is assumed to radiate isotropically. The pole separation is 2D, a known quantity, and leads to the expression $$\Delta x^2 + \Delta y^2 + \Delta z^2 = D^2 \qquad \text{Eq. (29)}$$

The magnetic flux density at any point $P_i$ ($x_i$, $y_i$, $z_i$,) due to each isotropic pole of this transmitter source will be $$B_{i\pm} = \pm\phi/4\pi r_{i\pm}^2 \qquad \text{Eq. (30)}$$

where $$r_{i\pm}^2 = [x_i-(x\pm\Delta x)]^2 + [y_i-(y\pm\Delta y)]^2 + [z_i-(z\pm\Delta z)]^2 \quad \text{Eq. (31)}$$

and the total magnetic flux density at the point will be the vector sum of that due to each pole of the transmitter.

Since the magnetic flux vector from each pole is oriented radially with respect to the pole location, the components of each flux vector at point $P_i$ are given by $$B_{i+x} = \frac{x_i-(x+\Delta x)}{r_{i+}} \frac{\phi}{4\pi R_{i+}^2}$$

$$= \frac{\phi}{4\pi} \frac{x_i-(x+\Delta x)}{r_{i+}^3}$$

and $$B_{i-x} = -\frac{\phi}{4\pi} \frac{x_i-(x-\Delta x)}{r_{i-}^3}$$

and therefore the net x component of magnetic flux density is $$B_{ix} = \frac{\phi}{4\pi}\left[\frac{x_i-(x+\Delta x)}{r_{i+}^3} - \frac{x_i-(x-\Delta x)}{r_{i-}^3}\right] \quad \text{Eq. (32)}$$

with similar expressions for the y and z components. Using these three expressions, and given a set of values for $\phi$, x, y, z, $\Delta x$, $\Delta y$, $\Delta z$, it is possible to compute the three-component outputs of a magnetic flux receiver sensor 22 placed at point $P_i$ with its three-component axes aligned with our original coordinate axis system. Furthermore, using two or more such receiver sensors 22, resulting in six equations, and the expressions relating $\Delta x$, $\Delta y$, $\Delta z$, to D as the seventh equation, if it is possible to solve the system of equations for the variables $\phi$, x, y, z, $\Delta x$, $\Delta y$, $\Delta z$, given the six receiver sensor readings. This, however, is not possible in closed form due to the complexity of the six receiver sensor equations but may be done by using an iterative technique such as discussed above.

LOCATION CALCULATION PROGRAMMING

One particular example of the computer programming steps required to implement the algorithm for calculating the location and orientation of an oscillating magnetic dipole field source is illustrated in the Software Flow Diagram, FIGS. 15, 16, and 17, and the computer program listing in Fortran language for use in a model PDP-11 computer is found in Appendix A. The Initialization Routine permits the entry of a number of values which define the system geometry and control parameters as follows:

1. The receiving system configuration
   (a) Number of sensors
   (b) Location of each sensor (X, Y, Z)
   (This case assumes the orientation of all receivers is parallel to the reference coordinate system.)
2. A best estimate for the transmitter, or signal source, which provides a starting point for the calculation but need not be accurate.
   (a) Location of the transmitter center (X, Y, Z)
   (b) Dipole vector azimuth ($A_z$ or $\alpha$,)
   (c) Dipole vector elevation (El or $\beta$,)
   (d) Magnetic dipole moment (m).
3. Calculation control parameters which relate to the desired accuracy of the result
   (a) Minimum signal-to-noise ratio (SNR) to be reached by the processed measured data before the computation of source location and orientation is attempted.
   (b) An error threshold above which the routine computing location and orientation will continue to iterate to achieve an answer of sufficient accuracy.

(Time limits can be added to (a) and (b) in the event excessive noise or other error sources prevent a satisfactory solution.)

Once the program is initialized, the operator is able to command a Verify Routine which allows the review and modification of previously entered data. The program may also be restarted or terminated at this point.

Upon entry of a Continue command, the program initializes information for a Data Acquisition Routine. This information includes the number of sensors and previously determined information such as system gains, number of samples per signal period and the number of signal periods to be measured. The Data Acquisition Routine then accumulates data as instructed and processes it to compute signal amplitude, phase and signal-to-noise ratio. (Note that manual entry of data is an alternative procedure.) If the SNR is below the specified level, additional data is accumulated and added to the previous data. When the SNR threshold is reached, the process of computing the transmitting source location and orientation can begin.

The location and orientation calculation is an iterative process where one or more of the six source parameters (X, Y, Z, Az, El, m) are adjusted on each iteration. An output of the computation, called EPSILON, is an error function which is a measure of how well a set of predicted measurements computed from the estimated source parameters fit the measured data. This process is repeated until the error function is reduced to the specified level. When the iteration process is completed, the computed "best fit" source location and orientation is displayed. A tolerance on each source parameter can also be determined as a function of the final error value and geometry. At this point, the program re-enters a command mode where the present data may be processed with revised limits or a new set of data may be taken and processed.

The computation subroutine called on each iteration is called Gradient Calculation, or GRDCAL. The purpose of this program is to calculate an error value as a function of the measured data and a data estimate and to determine the slope of the error with respect to each of the six source parameters X, Y, Z, Az, El and M. Changes to the source parameters can then be computed to improve the source parameter estimates and thus reduce the error function. (All references to source parameters below are to be interpreted as "the latest best estimate".)

When this subroutine is called, it first computes the sin and cos functions of the source azimuth and elevation from the source data (either first best estimate or last iteration) and frequently used products of these trigonometric functions. The X, Y and Z components of the field vector are computed from the source amplitude, azimuth and elevation and the 6 error slope accumulators are cleared.

A "DOLOOP" is then entered which is executed once for each sensor in the system.

First the X, Y, and Z components of Range are computed for the sensor from the source, then the Range (R) and other frequently used values are computed. Computed field values for each axis are then determined (FX, FY, FZ). These values represent the fields that would be measured if the estimate of the source parameters were in fact the actual parameters.

The first derivatives of each field component with respect to each of the six source parameters are computed, followed by computing the differences in measured fields and computed fields for each axis (HXMFX, HYMFY, HZMFZ). The contributions of that sensor to the six error slopes are determined and added to the error slope accumulators.

The error value for that sensor is determined and stored.

Once the above process is repeated for each sensor, Delta values can be computed for each source parameter. This process is both computational and analytical.

First the total field error is computed by summing the field error of each sensor. This value is then compared to the field error from the last iteration. If the new error is larger, the new error is replaced by the old error times a factor where the factor is less than 1.0 to prevent error oscillation and thus solution oscillation. The error slopes for elevation and azimuth are then weighted to make them comparable to the slopes for X, Y, and Z in terms of relative contribution to the error.

Five of the error slopes (magnitude is not included) are compared to determine the highest slope (absolute magnitude). Each of the five slopes are compared to the maximum slope.

The delta values for those slopes less than the maximum slope by some factor are set to 0. The delta values for the remaining slopes are, in this particular example, set as follows:

$$V = E^P / \text{SLOPE}$$

where the error (E) is raised to a power P. This has the effect of reducing the change as the error approaches 0 Since E is less than 1.0.

Setting the $\Delta V$'s to zero for relatively small slopes thus prevents large changes in those parameters since they contribute only a small portion of the total error. However, using a factor in the slope comparisons accomodates inaccuracies in weighting the error slopes for azimuth and elevation relative to those for X, Y, and Z, since they vary as a function of geometry.

Each $\Delta V$ is then multiplies by its respective gain and divided by the number of nonzero deltas. Dividing by the number of nonzero deltas simply reduces the gain when more than one change is made, preventing large overshoots.

Changes to the source magnitude are determined independent of the other five parameters and are simply proportional to the error slope for magnitude.

In FIG. 17 of the computer logic flow diagram, lines of the program listing of Appendix A are related to the various logic functions and the respective algorithm is also identified by equation number and related to the respective logic function.

A specific example of a solution of the field equations of Eqs. (17) for the case of FIG. 7 using the computer program of Appendix A is given in Apprendix B. In this example, the program of Appendix A and FIGS. 15-17 is entered at the point of the functional box labeled "input control parameters" of FIG. 15 at which point the real data from the sensors, etc., is inputted manually and the program bypasses that portion of the flow diagram intervening between that functional point and "CALL GRDCAL" of FIG. 16 so that, the program listing picks up again at "CALL GRDCAL".

In the example shown, the actual position orientation and moment of the unknown transmitter are given by:

$x = -10.000$
$y = 5.000$
$z = 36.000$
$A = 4.000$
$E = 3.000$
$M = 1,000,000$

The fields entered as data are those calculated from these parameters.

The initial trial parameters given the computer are:

$x = +10$
$y = +10$
$z = +40$
$A = +10$
$E = -3$
$M = 900,000$

As can be seen from the listing of successive approximations, after several tens of iterations, the solution is rapidly convergent to the correct answer.

In the present invention, as thus far described, the field equations of Eqs. (16, 17, etc.) have been solved for relative position (x,y,z) coordinates of the transmitter relative to the receiver. It is to be understood that these equations may also be solved for orientation of the receiver axes or transmitter axes, if unknown. There are important cases where orientation will be the unknown and the method and apparatus described herein is useful for determining the unknown orientation parameter.

EQUIPMENT DESCRIPTION

The location equipment of the present invention includes one or more transmitters 11 of the type shown in FIG. 5 which serve as the source of the oscillating magnetic field H, and one or more receivers 12 shown in FIG. 6 which serve to measure the resulting magnetic fields.

The transmitter 11 consists of a magnetic field antenna 16 along with the electronics and power source to drive it. The antenna 16 may be an air core loop 16a, e.g., in planar form or a ferromagnetic core loop 16, e.g., in solenoid form as described in the aforecited U.S. Pat. No. 3,967,201. These loops each produce a magnetic field pattern equivalent to those for an infinitesimal dipole at distances that are large compared to the antenna dimensions. A measure of the transmitter source field strength and field direction is given by the equivalent magnetic dipole moment in terms of Ampere·Turn·Meter$^2$ and a vector direction normal to the plane of the loop. In some cases, a slightly different field model is useful such as two opposite monopoles separated by a distance, d, when working relatively close to a long solenoid (see FIG. 18). The primary advantage of the ferromagnetic core antenna 16 is that it produces a relatively large dipole moment in a compact solenoid configuration that is ideal for borehole use, and it is the only practical way to generate sufficiently large signals in the majority of underground applications.

The transmitter 11 includes an oscillator 13 which, in a preferred embodiment, includes a crystal for precisely controlling the operating frequency to parts per million per degree centigrade. The oscillator output frequency is preferably within the range of 1 to 1000 Hz and its output is fed to a high efficiency transmitter drive 14, the output of which is coupled via coupler 15 into transmitting antenna 16. The inductive antenna is driven with an alternating current by the high efficiency electronics 14 that may be of the direct switching, resonant capacitor storage or other type depending on the application. The efficiency can be optimized by tailoring the drive voltage and current, the winding loss, the ferromagnetic core loss, and the other electronic loss to suit a given application.

One or more antennas 16 may be coupled to the output of the coupler 15. The antennas 16 may have their axes oriented in a certain relationship, i.e., orthogonal, depending upon the particular circumstances of the location system being employed.

In some embodiments, it is important to know more information about the transmitter antenna 16. Therefore, certain accessory navigation components, i.e., tiltmeters, magnetic compass, etc., and communication functions may be employed with the transmitter to provide that such accessory information is either superimposed upon the transmitted magnetic fields as by modulation or the accessory information may be fed from the respective function generators via a separate communication link to the receivers 12 or to a central location where the location computations are to be performed.

In one embodiment, the accessory navigation of uplinked communication functions include a two or three-axis tiltmeter, the outputs of which are fed into a multiplexer and A to D converter 17 and thence into the input of a modulator 18 which serves to modulate the phase of the transmitted oscillating magnetic field. Other monitoring and logging functions such as temperature sensing, static magnetic (earth) field direction, etc., may have their inputs fed into the multiplexer and A to D converter 17 and similarly modulated onto the transmitted magnetic field. (This information can be communicated directly when a wireline is used to drive the antenna.) The information may be digitized and encoded in a pseudo noise format for efficient communication under poor signal to noise conditions.

Batteries 19 may be employed at the transmitter station for suplying power to the various power consuming units or, as an alternative, power may be supplied from a central source via a wire or cable. The transmitting antenna 16 may also be operated by wireline from some remote location.

In addition, an auxiliary down-link command or communication function may be performed by means of a receiver 21 coupled to the antenna 16 via coupler 15 and the output of the receiver being fed to a decoder 20 which decodes the information received by the antenna. The decoder outputs the decoded information to the appropriate circuit functions.

Referring now to FIG. 6, there is shown the receiver 12. The receiver 12 includes the basic magnetic field sensor 22 such as a one to three-axis magnetic field vector sensor 22. Such a sensor may comprise, for example, a magnetometer of some type such as a flux gate, superconducting etc., or a search coil, i.e., loops of conductors. In addition, the magnetic field sensor 22 may include a one to three-axis tiltmeter coupled thereto and tiltable with the field sensor 22 so as to derive the orientation of the field sensor relative to the earth's gravitational field.

The output of the magnetic field sensor 22 is fed to a wide band filter and amplifier 23 for filtering and amplification and the output of the amplifier is fed to a multiplexer and analog-to-digital converter 24 for quantifying the tiltmeter readings, if present. The transmitter 11 and receiver 12 operating frequency stability is controlled to permit coherent (amplitude and phase) detection under noisy signal conditions.

The digitized and multiplexed outputs from the multiplexer 24 are fed to the input of a data transmission system such as a wireline, radio frequency transmitter or the like 26 for transmission to the data reduction equipment including a digital processor 27. In some applications, more than one set of magnetic field sensors 22 are employed in which case the outputs from the other sensors 22 are fed into the digital processor 27 via a digital multiplexer 28 which multiplexes all information derived from the various sensors. In a typical example, the digital processor 27 includes a microprocessor, APU, ROM, RAM, etc. A keyboard and display 29 is interactively coupled with the digital processor 27 and a printer or graphic plotter 31 is interactively coupled with the keyboard and display 29 for printing out and plotting data derived from the keyboard 29 and digital processor 27.

In the preferred form, the weak fields measured by the sensor 22 undergo some filtering, amplification (with automatic gain control to track varying conditions) and digitizing right at the remote detector location prior to communication with the main portion of the receiver or data reduction equipment. After transmission, the various channels of information are multiplexed into a digital processor 27 such as a microprocessor based computing system. The important signal processing functions of impulse noise editing, filtering the signals to suitable quality, noise evaluation, coherent detection to determine phase and amplitude, and decoding any information transmitted are then performed digitally from software programs prior to doing the location calculations. The location calculations are performed after the receiver (or transmitter) location and alignment reference information is entered with the keyboard 29 or alternatively in fixed installations, with a programmable read only memory (PROM). The results are presented on the display 29, printer 31 or graphics plotter 31.

In some applications it may be desirable to use a microprocessor right at the remote sensor(s) for doing all of the signal processing prior to transmission to the central computer 27 (or for doing the entire location calculation) and transmitting only the results when communication channel capacity is limited. The basic receiver 12 can also be implemented by using conventional hardware techniques for the filtering and coherent detection functions, etc., and the location calculations can be done using a programmable hand calculator.

In applications that only require a single sensor, such as for steering or location by the moving transmitter method, the data reduction functions are often included in the sensor data unit. The computed steering or location information may then be transmitted to a remote display 32.

Either the transmitter(s) or the receiver(s) may be the unknown (u) with the other being the known (k). Because of its rugged nature in one particular form, one single axis transmitting antenna 16 is usually used at the unknown location (u), e.g., in a borehole or at a drill bit.

The receiver 12 is usually located for direct operator access since it is easier to very precisely align the relatively small receiver sensors and to limit noise induced by mechanical motion of the sensor 22 in the earth's field. However, the roles can be reversed, through appropriate system design, to suit the needs of specific applications.

In general, an array of some appropriate combination of transmitter and receiver elements 11 and 12 is used to obtain enough information for calculating the relative orientation and position of the array elements. For example, the two three-axis receivers 12, of known orientation and location (k), may be used to determine the orientation and location of an unknown single axis transmitter T(u). Other combinations are possible as described below. In all methods, except for steering only, the best accuracy will be achieved when the span between the known array elements (e.g., receiver or transmitter stations) is on the order of the distance between the known array and the unknown. However, it is usually possible to obtain very satisfactory results with much shorter spans, although higher signal to noise ratios and better reference alignment will be required in such cases.

In the basic application, one or more three-axis sensors 22 are used to measure total vector field and are positioned and aligned with respect to some surveyed reference location. This may be accomplished manually by using a transit or automatically by using techniques described below. Two or more sensors 22 may also be pre-mounted on a rigid beam, when the practical spans are adequate, to maintain accurate relative alignment or simplify field set-up. This also facilitates the use of two or more sensors 22 as the unknowns R(u) in inaccessable locations.

Various features can be incorporated to simplify or automate the alignment process or to aid the location calculation process. For example, sensitive two or three-axis tiltmeters can be used to eliminate the need for manual leveling, and the information used to calculate vertical orientation with respect to any set of reference coordinates. In those limited cases where local magnetic anomalies are very small, the earth's magnetic field can be used to determine azimuth for automatic correction of rotation. In both of these cases it is still desirable to accurately measure position when the receiver 12 is the known reference R(k). There are many situations when it is not practical to determine receiver position or orientation by conventional means, such as when it is necessary to deploy receivers at the bottom of a waterway. In these cases, two or more reference transmitters T1(k), T2(k) can be installed at a convenient and precisely surveyed location or locations which will permit automatic calculation of receiver position and orientation. The receiver(s) can then be located as the unknown then used to determine the position of another, unknown transmitter. In general, the orientation of the transmitting antenna's major axis (loop axis) and the antenna location can be determined from the field measurements. However, the rotation of the antenna about its major axis (commonly referred to as the tool face angle in drilling) cannot be directly determined. Except in near vertical holes, rotation may be determined when necessary by adding a two or three-axis tiltmeter to measure orientation with respect to vertical and transmitting this information to the receiver 12 by means described above. Integral tiltmeters can also be used as a cnvenient accessory in certain applications such as aiding the calculation of the unknown transmitter location under very noisy conditions or for determining vertical profile with a single sensor or in aligning the transmitter when it is used as a known reference T(k). Co-located two and three-axis transmitting dipoles are an alternative method for determining rotation as well as being useful in other applications described below.

Location system accuracy is dependent on a number of mechanical and electrical factors. The mechanical factors involved primarily have to do with the alignment and location survey precision of the basic reference used whether it's the receiver(s) or transmitter(s) in the particular application. Mechanical factors can generally be controlled to achieve sufficiently accurate measurements, in practical applications, unless initial hardware cost is a major consideration in which case performance tradeoffs may be necessary. The electrical factors involved are much more diverse and uncontrollable. The effects of attenuation, scattering in a highly inhomogenous conducting medium, distortion by magnetic materials and mechanically induced noise have already been mentioned. Magnetic noise from extraterrestrial sources, worldwide thunderstorm activity and electric power line transients is also one of the major functions which limit system performance. The effects of these factors are minimized through suitable choice of operating frequency, signal processing methods and control or measurement of the reference set-up.

APPLICATION SUMMARY

In general, six independent items of information (signal measurements) are required to define the six unknowns of location (3 degrees of freedom) orientation (2 degrees of freedom), and magnitude (1 degree of freedom) of the transmitter or receiver. The absolute phase of the alternating transmitter magnetic moment, although it may be unknown to the receiver, is not an additional unknown in the solution of the location problem as long as the relative phases of all received magnetic field components are measured.

Of the various cases described below, some are capable of the complete solution for six unknowns. Others, as noted, require either specification of some parameters (e.g. moment, one component of transmitter orientation, one component of transmitter position) or some constraint, such as the assumption that the axis orientation of a moving transmitter, although unknown, is invariant or follows a known constraint such as a circular arc. Some cases may be overspecified, that is, more measurements are obtained than there are degrees of freedom. In these cases, a best fit to the known constraints should be applied to make use of all available data, since the measurements are known to be noisy. Even in cases that are not overspecified (measurements match unknowns), due to the inevitable errors in data, a best fit approach is employed rather than seeking an exact solution, which may not exist.

Referring now to FIGS. 7–9, there is shown a class of cases utilizing one single axis transmitter and plural three-axis receivers. This is an important case, as it is a method useful in borehole surveying, river crossing drill guidance, pipeline tunneling guidance, mine surveying, and shaft location. The solution is generally completely specified by the data, meaning, that the six measurements of field (3 axes×2 locations) allow simultaneous solution of six equations (three for each receiver) of the type of Eqs. (17) for all six unknowns by the field calculation method described herein.

Only a single axis (magnetic dipole) transmitter is required. This is particularly advantageous in borehole applications, where geometry is limited to one large (axial) and two small (radial) dimensions. Under this constraint, a ferromagnetic-cored solenoid 16 is capable of generating a much larger magnetic moment in the axial direction than in the radial directions, and a very much larger axial moment than any nonmagnetic-cored coil 16a, for the same power input.

The magnitude of the transmitter magnetic moment need not be known a priori to complete the solution, which includes computation of the moment from the data. This is important for use in cased holes, where the effective moment "seen" outside the casing by the receiver 12 is an attenuated version of the moment actually produced by the transmitter 11 inside the casing. This attenuation is a function of the diameter, thickness, electrical conductivity, and magnetic permeability of the casing, and of the frequency and position of the transmitter inside it. In some applications, such as a transmitter fixed inside a drill head which will be beyond the casing in operation, the attenuation can be calibrated by measurement and then considered invariant. In other cases, such as surveying an already cased hole, the attenuation is not only unpredictable but may vary along the length of the hole due to multiple casings, different materials used in different sections, corrosion, etc.

The orientation of the transmitter magnetic moment need not be known a priori to complete the solution, which includes computation of this orientation from the data. This is important in cased holes, where the effective moment orientation may be distorted by non-uniform attenuation, or by the position of the transmitter within the casing. It also provides a by-product of direct measurement of the drill orientation in casing-free operation.

Computation for this general case requires knowledge of the (relative) position of the two receiver sensors 22, and the orientation of their axes with respect to their baseline (the line connecting the centers of the sensors) and one other independent direction, such as the vertical, which together define a sensor coordinate base. The position and orientation of the transmitter are then calculated in this sensor (receiver) coordinate base; to the extent that the sensor coordinate base origin and orientation are known in some other reference coordinates, to within the additional accuracy of the location system. This accuracy is in turn determined by the magnitudes of the moment and the local noise level; the time available for measurement; the geometry (spacing between sensors 22 and from each sensor 22 to the source 16); and the accuracy with which the gain and orientation (within the sensor coordinate base) of each sensor axis are known.

As can be seen by reference to FIG. 7, the location of the transmitter T may be unknown (u) and computed, given the known location (k) of the receivers $R_1$ and $R_2$.

Alternatively, in FIG. 8, the location of the receivers $R_1$ and $R_2$ may be computed from knowledge of the known position (k) of the transmitter T and measurements of the magnetic field components derived from the receivers $R_1$ and $R_2$ and the coordinate system defined by $R_1$ and $R_2$. The reciprocal arrangement of FIG. 8 is also useful, i.e., the location of the T(u) can be computed from data derived from the known location of the receivers $R_1$ and $R_2$.

This latter case is depicted in FIG. 9 as well, and is useful for blind surveying where only approximate location data is acceptable.

There are certain loci of ambiguity, such as when the transmitter axis lies (1) in a plane bisecting the baseline between the sensor 22 or (2) tangent to any circle whose axis is the baseline between sensors 22, where there is insufficient information to obtain a solution. In those cases where it is not possible to control the geometry to avoid the problem, the required additional information can be obtained in several ways. Independent measurements of one or more components of transmitter orientation and some other constraint (e.g., moment or depth in the hole) can be made in some application such as drilling. Alternatively, a third sensor can be used when the transmitter must be kept extremely simple such as for trapped miner location. Similar techniques are also useful when the signals are contaminated by extremely high noise levels.

Referring now to FIG. 10, there is shown a class of cases which can be considered the reciprocal of the case for FIGS. 7-9 and, more particularly, a class of cases wherein one single axis receiver is utilized with a pair of three-axis transmitters. This example is particularly useful in mining and relies upon the fact that the position of the first transmitter $T_1$ is known relative to the position of the second transmitter ($T_2$) to define a coordinate system for determining the relative location of a receiver at an unknown (U) location. Conversely, if the position of the receiver is known (K) the position of the transmitters relative to the receiver may be calculated, again assuming that the position of one transmitter relative to the other is known such as the transmitter being co-located on a single beam or structure, the axes of the first and second transmitters being known relative to each other.

By reciprocity (exchange of transmitter and receiver), all the characteristics denoted in the case of FIGS. 7-9 above apply. This present case has potential application to the location of a trapped miner, who can deploy a wire loop receiving antenna (of unknown size or axis orientation, due to tunnel size restrictions, floor irregularities, rock falls, etc.) connected to a battery powered electronic system capable of receiving and measuring the six transmitted signals, and relaying the information to the surface. In this embodiment, the six necessary transmissions could be made in time sequence, and the magnitude and crude phase of each measurement relayed. Alternate embodiments include transmission of multiple frequencies, with modulation to provide a phase reference; transmission of independent pseudorandom-coded modulation; and computation of position before relaying to minimize the amount of relayed data.

Referring now to FIG. 11, there is shown a class of cases employing a pair of distinctively encoded (e.g. time shared, frequency separated or otherwise encoded) single-axis transmitters and one three-axis receiver. In this class of cases, the relative position of the two transmitters $T_1$ and $T_2$ is known to define a reference set of coordinates. The location of the transmitter stations may be known to derive the unknown location of the three axes receiver or, in the alternative, the position of the three axes receiver may be known to determine the location of the single axis transmitters, $T_1$ and $T_2$.

The case of FIG. 11 is particularly applicable to surveying deep boreholes by deploying two separated transmitting loops 16a on the surface or sea floor, capable of producing the very large moments needed for deep penetration. (The source locations, moments, and orientations will be determined by measuring their fields at multiple known locations, as in the cases of FIGS. 7–9.) This method usually results in complete specification of the problem in six unknowns, e.g., both source loops 16a and the sensor 22 location all co-planar, with unknown attenuation. Thus, the location and orientation of a three-axis receiver sensor 22 in a borehole may be determined by transmission of received or processed data from the receiver 12 to the surface either by wireline or by telemetry. In this case, as in all cases in which a multi-axis sensor (or transmitter) is located in a borehole, penetration of casing will invalidate the computations unless accurate values of axial and radial attenuation are known, since these values will generally be different.

Alternatively, if the location of the receiver sensor 22 is known and the relative positions and orientations of the two transmitters $T_1$ and $T_2$ one with respect to the other is known, the location of the transmitters $T_1$ and $T_2$ can be calculated from the field measurements derived from the three axes receiver sensor 22.

As in the cases of FIGS. 7–9, if the geometry happens to contain a locus of ambiguity, additional information such as the orientation of the unknown (u) and the constraints can be obtained in order to achieve a solution for location.

Referring now to FIG. 12, there is shown a case employing a single, distinctively encoded, two-axis transmitter and a single three-axis receiver for determining relative location of the transmitter station relative to the receiver station. In this embodiment, the orientation of the transmitter is known and the moment of the transmitter is known. If the location of the two axis transmitter is known, the unknown position of the three-axis receiver (R) can be calculated from the field measurements derived from the receiver. Alternatively, if the receiver location is known, the location of the two-axis transmitter can be calculated from field signals derived from the receiver. In this embodiment, the two axes of the transmitter are preferably nearly perpendicular and the transmitting antennas 16 are co-located. This permits use of a single transmitting antenna structure, although it requires at least two large dimensions (e.g., crossed iron-cored solenoids), precluding its use in a borehole if substantial magnetic moment is required. It should also be noted that penetration of casing of unknown attenuation, or any other loss of calibration of received signals relative to the transmitter moment, will invalidate the position calculation in this case.

Referring now to FIGS. 13 and 14, there is shown a class of cases employing only one single-axis transmitter and one three-axis receiver.

In FIG. 13, a case is shown wherein the single-axis transmitter T is moved to two or more unknown locations, e.g., lowered in known steps down a borehole and a single three-axis receiver sensor 22 is positioned at a known location.

The case of FIG. 13 is useful for locating cased vertical shafts relative to drifts. An iron-cored solenoid transmitter antenna 16, driven by wireline from the surface, is lowered in measured steps down the shaft, and three axes field measurements are made by a fixed receiver sensor 22 in the drift for each transmitter location, T, T', etc. The casing attenuation and, therefore, the effective transmitter moment, are unknown. Thus, even assuming the transmitter antenna orientation to be known (vertical), no single location of the transmitter is completely specified, since there are four unknowns (3 in position; 1 in moment) and only three measurements. To provide the additional information needed to specify a solution, it is assumed that the transmitter moment is constant, vertical, and moved in known steps on a vertical axis. Theoretically, two such locations are sufficient. In practice, there may be anomalies (of unknown location) in the casing, such as holes, pipes, and pumps. Therefore, data are collected at many steps, and those points that obviously violated the assumptions are discarded. A "best fit" (overspecified) solution is then computed from the remainder.

In alternate embodiments of this method, utilizing more general computation approaches, constraints will be relaxed. For instance, an arbitrary but invariant transmitter moment and direction, moved in known steps along an axis of arbitrary direction, is solvable by the iterative "best fit" computation process above described relative to FIG. 13.

Referring now to FIG. 14a, there is shown a special case for the class of FIGS. 13 and 14 wherein a single axis transmitter T of known location, T(k) orientation and moment is employed with a three-axis receiver sensor 22 of know orientation. This method is particularly suitable for deep hole surveying, similar to the embodiment of FIG. 13, but when the receiver sensor orientation is known, such as by incorporation of tiltmeters and a magnetic compass at the receiver location (which may use the same magnetic sensor as the location system) in the downhole tool. In this case, only a single transmitting antenna 16 is required allowing the dedication of all available real estate to one large loop 16a for extremely deep holes, or restricted access on the surface. The position of the receiver is calculated from the magnetic field components received at the receiver station and the sensor orientation information.

In FIG. 14b, a single-axis transmitter (T) of unknown (u) location is employed in a drilling assembly and a single three-axis receiver sensor 22 is positioned within a core (eg 45° half angle) ahead of the drill at a known (k) location (e.g., on the surface or in a tunnel or borehole) and generally in the plane of the hole being drilled. With a calibrated transmitter moment and continuous measure of its inclination (by wireline on modulation of the navigation signal) or length of the drill string in the hole, a predetermined vertical profile can be followed by calculating the depth and steering accordingly. An alternative is to use the inclination and length of drill string only for vertical steering. Horizontal steering can be achieved by using a magnetic compass or the horizontal magnetic field components received at the sensor station. If the sensor is at the final target location, the received fields can be used to steer the drill straight toward an aligned sensor or in an arc toward an inclined sensor (mechanically or electrically rotated) without knowledge of moment, inclination or pipe length. The locus of the final borehole can be calculated by the iterative "best fit" process using data collected during drilling.

An alternative is shown in FIG. 14c in which the single three-axis receiver sensor 22 is at the unknown (u) location in the drill assembly and a single-axis transmitter is positioned at the known (k) location. This configuration has advantages when it is desired to use the sensor as a magnetic compass and a receiver but vibration-induced noise will usually preclude its use while actually drilling.

With regard to the above examples of FIGS. 7-14, more than one transmitter frequency may be employed to resolve propagation attenuation problems. When employing more than one transmitting antenna or transmitting axis, the transmitters may be switched in an unambiguous sequence (e.g. off, A, B) to provide reference information to the receiver sensor 22.

With regard to the receiver stations, the receiver sensor 22 may be adapted for sensing the static magnetic (earth) field to define receiver sensor orientation. This information may be utilized in the calculations deriving the position of the unknown transmitter or receiver stations. Also with regard to the receiver station, the receiver sensors 22 may be mounted on a common beam to control relative alignment and spacing therebetween.

APPENDIX A

```
KB:<SHLOC9.LST

FORTRAN V09.02                    15:55:02      09-MAR-79      PAGE    1
       C
       C    BORE HOLE LOCATOR
       C    BHLOC.FTN[200,200]
       C
       C    COMMON MEMORY
0001        INTEGER VFLAG,CHGFLG,PRNCNT,PRNKNT,ELIM,PRCNT,ECFLAG
0002        COMMON SNSXYZ(10,3),SNSDAT(10,3),SRCDAT(6),SIMSRC(6),
           1 VFLAG,CHGFLG,PI,N,EPSLON,EPSLNA(10),ICNT,ILIM,ELIM,PRCNT,
           2 LINCNT,PRNCNT,PRNKNT,EPSLIM,ECFLAG,GAINX,GAINA,
           3 GAINB,GAINM,KERR

0003        BYTE ASCII
       C
0004        PI=3.141593
0005        WRITE(6,100)
0006    100 FORMAT('0BOREHOLE LOCATOR PROGRAM-MULTI-SENSOR/SINGLE SOURCE')
0007    002 ICNT=0
0008        VFLAG=0
0009        PRNCNT=0
0010    003 CALL SNSPOS
0011        CALL SRCPOS(SRCDAT)
0012    103 WRITE(6,101)
0013    101 FORMAT(' $ENTER S(SIMULATED) OR R(REAL)DATA:')
0014        READ(6,102)ASCII
0015    102 FORMAT(1A1)
0016        IF(ASCII.EQ.'S')GOTO 110
0017        IF(ASCII.NE.'R')GOTO 103
0018        CALL REALDT
0019        GOTO 120
0020    110 CALL SIMDAT
0021    120 CALL PRNSET
0022        CALL STGAIN
0023    122 CALL SETLIM
0024        VFLAG=-1
0025    123 WRITE(6,121)
0026    121 FORMAT(' $ENTER-R(RESTART),V(VERIFY),I(ITERATE),C(CONTINUE
           1) OR T(TERMINATE)')
0027    130 READ(6,102)ASCII
0028        IF(ASCII.EQ.'R')GOTO 002
0029        IF(ASCII.EQ.'V')GOTO 003
0030        IF(ASCII.EQ.'T')GOTO 10000
0031        IF(ASCII.EQ.'I')GOTO 122
0032        IF(ICNT.GE.ILIM)GOTO 600
0033        IF(ASCII.NE.'C')GOTO 123
0034    200 CALL GRDCAL
0035        ICNT=ICNT+1
0036        PRNKNT=PRNKNT+1
0037        IF(PRNKNT.NE.PRNCNT)GOTO 500
0038        CALL PRINT
0039    500 IF(EPSLON.LE.EPSLIM)GOTO 600
0040        IF(ICNT.LT.ILIM)GOTO 200
0041    600 CALL PRINT
0042        WRITE(6,601)
```

```
0043 601  FORMAT('$ENTER-R(RESTART),V(VERIFY),I(ITERATE)OR T(T
         1ERMINAT)')
0044      GOTO 130
0045 10000 END

ROUTINES CALLED:
    SNSPOS, SRCPOS, REALDT, SIMDAT, PRNSET, STGAIN, SETLIM
```

FORTRAN V09.02                 15:55:02     09-MAR-79     PAGE    2

GRDCAL, PRINT

OPTIONS =/OP:1

```
BLOCK       LENGTH
 MAIN.      512    (002000)*
 .$$$$.     202    (000624)
```

```
COMPILER ----- CORE
    PHASE       USED   FREE
DECLARATIVES   00622  14705
EXECUTABLES    01049  14278
ASSEMBLY       01475  18559
```

```
0001        SUBROUTINE GRDCAL
        C
        C   COMMON MEMORY
0002        INTEGER VFLAG, CHGFLG, PRNCNT, PRNKNT, ELIM, PRCNT, ECFLAG
0003        COMMON SNSXYZ(10,3), SNSDAT(10,3), SRCDAT(6), SIMSRC(6),
           1 VFLAG, CHGFLG, PI, N, EPSLON, EPSLNA(10), ICNT, ILIM, ELIM, PRCNT
           2 LINCNT, PRNCNT, PRNKNT, EPSLIM, ECFLAG, GAINX, GAINA,
           3 GAINB, GAINM, KERR
        C
0004        DIMENSION A(6,6), B(6)
0005        REAL M, MX, MY, MZ
        C
0006        CA=COS(SRCDAT(4))
0007        CB=COS(SRCDAT(5))
0008        SA=SIN(SRCDAT(4))
0009        SB=SIN(SRCDAT(5))
0010        CACB=CA*CB
0011        CASB=CA*SB
0012        SACB=SA*CB
0013        SASB=SA*SB
0014        M=SRCDAT(6)
0015        MX=M*CACB
0016        MY=M*SB
0017        MZ=M*SACB
0018        DO 100 J=1,6
0019    100 B(J)=0.0
0020        DO 999 J=1,N
0021        X=SRCDAT(1)-SNSXYZ(J,1)
0022        Y=SRCDAT(2)-SNSXYZ(J,2)
0023        Z=SRCDAT(3)-SNSXYZ(J,3)
0024        R=SQRT(X**2+Y**2+Z**2)
0025        W=1/(4*PI*R**5)
0026        XXYZ=2*X**2-Y**2-Z**2
0027        YYZX=2*Y**2-Z**2-X**2
0028        ZZXY=2*Z**2-X**2-Y**2
0029        FX=W*(MX*XXYZ+MY*3*X*Y+MZ*3*X*Z)
0030        FY=W*(MX*3*X*Y+MY*YYZX+MZ*3*Y*Z)
0031        FZ=W*(MX*3*X*Z+MY*3*Y*Z+MZ*ZZXY)
0032        DXDM=FX/M
0033        DYDM=FY/M
0034        DZDM=FZ/M
0035        WM=W*M
0036        DXDA=WM*(-SACB*XXYZ+CACB*3*X*Z)
0037        DYDA=WM*(-SACB*3*X*Y+CACB*3*Y*Z)
```

```
0038            DZDA=WM*(-SACB*3*X*Z+CACB*ZZXY)
0039            DXDB=WM*(-CASB*XXYZ+CB*3*X*Y-SASB*3*X*Z)
0040            DYDB=WM*(-CASB*3*X*Y+CB*YYZX-SASB*3*Y*Z)
0041            DZDB=WM*(-CASB*3*X*Z+CB*3*Y*Z-SASB*ZZXY)
0042            X5R2=5*X/R**2
0043            DXDX=W*(MX*4*X+MY*3*Y+MZ*3*Z)-X5R2*FX
0044            DYDX=W*(MX*3*Y-MY*2*X)-X5R2*FY
0045            DZDX=W*(MX*3*Z-MZ*2*X)-X5R2*FZ
0046            Y5R2=5*Y/R**2
0047            DXDY=W*(-MX*2*Y+MY*3*X)-Y5R2*FX
0048            DYDY=W*(MX*3*X+MY*4*Y+MZ*3*Z)-Y5R2*FY
0049            DZDY=W*(MY*3*Z-MZ*2*Y)-Y5R2*FZ
0050            Z5R2=5*Z/R**2
0051            DXDZ=W*(-MX*2*Z+MZ*3*X)-Z5R2*FX
0052            DYDZ=W*(-MY*2*Z+MZ*3*Y)-Z5R2*FY
0053            DZDZ=W*(MX*3*X+MY*3*Y+MZ*4*Z)-Z5R2*FZ
       C
       C        NOW CMPUTE HX-FX,HY-FY,ETC. FOR SENSOR I
       C
0054            HXMFX=SNSDAT(J,1)-FX
0055            HYMFY=SNSDAT(J,2)-FY
0056            HZMFZ=SNSDAT(J,3)-FZ
       C
       C        NOW SUM B ARRAY
       C
0057            B(6)=B(6)+(HXMFX*DXDM+HYMFY*DYDM+HZMFZ*DZDM)
0058            B(4)=B(4)+(HXMFX*DXDA+HYMFY*DYDA+HZMFZ*DZDA)
0059            B(5)=B(5)+(HXMFX*DXDB+HYMFY*DYDB+HZMFZ*DZDB)
0060            B(1)=B(1)+(HXMFX*DXDX+HYMFY*DYDX+HZMFZ*DZDX)
0061            B(2)=B(2)+(HXMFX*DXDY+HYMFY*DYDY+HZMFZ*DZDY)
0062            B(3)=B(3)+(HXMFX*DXDZ+HYMFY*DYDZ+HZMFZ*DZDZ)
       C
       C        NOW COMPUTE ERROR FOR SENSOR I
       C
0063   999      EPSLNA(J)=(SNSDAT(J,1)-FX)**2+(SNSDAT(J,2)-FY)**2+
              1 (SNSDAT(J,3)-FZ)**2
0064            ENEW=0.0
0065            DO 8888 J=1,N
0066   8888     ENEW=ENEW+EPSLNA(J)
0067            IF(EPSLON.EQ.0)GOTO 7000
0068            IF(ENEW.LT.EPSLON)GOTO 7000
0069            EPSLON=.999*EPSLON
0070            GOTO 7001
0071   7000     EPSLON=ENEW
0072   7001     EPSLN2=EPSLON**1.10
0073            B(4)=B(4)/75.
0074            B(5)=B(5)/75.
       C        WRITE(6,5555)B
0075            T1=ABS(B(1))
0076            DO 5000 J=2,5
0077            T2=ABS(B(J))
0078            IF(T1.GE.T2)GOTO 5000
0079            T1=T2
0080   5000     CONTINUE
0081            II=0
0082            DO 6000 J=1,5
0083            T2=B(J)/.60
0084            T2=ABS(T2)
0085            IF(T2.LT.T1)GOTO 6001
0086            B(J)=EPSLN2/B(J)
0087            II=II+1
0088            GOTO 6000
0089   6001     B(J)=0.0
0090   6000    CONTINUE
       C        B(6)=EPSLON/B(6)
       C        WRITE(6,5555)B
0091   666      DO 555 J=1,3
```

```
0092    555     SRCDAT(J)=SRCDAT(J)+B(J)*GAINX/II
0093            SRCDAT(4)=SRCDAT(4)+GAINA*B(4)/II
0094            SRCDAT(5)=SRCDAT(5)+GAINB*B(5)/II
0095            SRCDAT(6)=SRCDAT(6)+GAINM*(10.0**11)*B(6)
0096    5555    FORMAT(' ',6E13.5)
0097            RETURN
0098            END

ROUTINES CALLED:
```

FORTRAN V09.02                    14:11:40   19-MAR-79   PAGE

```
        COS  , SIN  , SQRT , ABS

OPTIONS =/OP:1

BLOCK       LENGTH
        GRDCAL   1747   (006646)*
        .$$$$.    202   (000624)

COMPILER ----- CORE
            PHASE      USED  FREE
        DECLARATIVES  00622 14705
        EXECUTABLES   01529 13798
        ASSEMBLY      01827 18207
        C
        CBORE HOLE LOCATOR SUBROUTINES
        C
        C       BHSBR1.FTN[200,200]
        C
0001            SUBROUTINE INTIN(N,M,I)
        C
0002    100     READ(6,101,ERR=200)II
0003    101     FORMAT(I5)
0004            IF(II.LT.N)GOTO 200
0005            IF(II.LE.M)GOTO 300
0006    200     CALL ERROR
0007            GOTO 100
0008    300     I=II
0009            RETURN
0010            END

ROUTINES CALLED:
        ERROR

OPTIONS =/OP:1

BLOCK       LENGTH
        INTIN     80    (000240)*

COMPILER ----- CORE
            PHASE      USED  FREE
        DECLARATIVES  00702 14625
        EXECUTABLES   00702 14625
        ASSEMBLY      00954 19080
```

FORTRAN V09.02                    15:49:13   12-MAR-79   PAGE    1

```
        C
        C
0001            SUBROUTINE FPIN(A,B,C)
0002    100     READ(6,101,ERR=200)CC
0003    101     FORMAT(1F)
0004            IF(CC.LT.A)GOTO 200
0005            IF(CC.LE.B)GOTO 300
0006    200     CALL ERROR
0007            GOTO 100
```

```
0008    300     C=CC
0009            RETURN
0010            END

ROUTINES CALLED:
        ERROR

OPTIONS =/OP:1

BLOCK       LENGTH
        FPIN    85      (000252)*

COMPILER ----- CORE
            PHASE       USED    FREE
        DECLARATIVES    00702   14625
        EXECUTABLES     00702   14625
        ASSEMBLY        00958   19076
0001            SUBROUTINE ERROR
        C
0002            WRITE(6,100)
0003    100     FORMAT(' ERROR-TRY AGAIN!')
0004            RETURN
0005            END

OPTIONS =/OP:1

BLOCK       LENGTH
        ERROR   36      (000110)*

COMPILER ----- CORE
            PHASE       USED    FREE
        DECLARATIVES    00702   14625
        EXECUTABLES     00702   14625
        ASSEMBLY        00938   19096

C
0001            SUBROUTINE AZIN(A)
0002            PI=3.141593
        C
0003            WRITE(6,200)
0004    200     FORMAT('$ENTER AZIMUTH:')
0005    100     CALL FPIN(0.0,360.0,B)
0006            A=PI*B/180.
0007            RETURN
0008            END

ROUTINES CALLED:
        FPIN

OPTIONS =/OP:1

BLOCK       LENGTH
        AZIN    84      (000250)*

COMPILER ----- CORE
            PHASE       USED    FREE
        DECLARATIVES    00622   14705
        EXECUTABLES     00783   14544
        ASSEMBLY        01006   19028

C
0001            SUBROUTINE ELIN(A)
0002            PI=3.141593
0003            WRITE(6,200)
0004    200     FORMAT('$ENTER ELEVATION:')
0005    100     CALL FPIN(-90.0,90.0,B)
```

```
0006            A=PI*B/180.0
0007            RETURN
0008            END

ROUTINES CALLED:
        FPIN

OPTIONS =/OP:1

BLOCK       LENGTH
        ELIN        91      (000266)*

COMPILER ----- CORE
            PHASE       USED    FREE
        DECLARATIVES    00622   14705
        EXECUTABLES     00702   14625
        ASSEMBLY        01026   19008

C
0001            FUNCTION DDEG(A)
0002            PI=3.141593
0003            DDEG=A*180.0/PI
0004            RETURN
0005            END

OPTIONS =/OP:1

BLOCK       LENGTH
        DDEG        48      (000140)*

COMPILER ----- CORE
            PHASE       USED    FREE
        DECLARATIVES    00622   14705
        EXECUTABLES     00702   14625
        ASSEMBLY        00898   19136
```

FORTRAN V09.02                  15:49:59    12-MAR-79   PAGE    1

```
        C
0001            SUBROUTINE MAGIN(A)
        C
0002    99      WRITE(6,100)
0003    100     FORMAT('$ENTER MAGNITUDE:')
0004            READ(6,101,ERR=102)A
0005    101     FORMAT(F)
0006            RETURN
0007    102     CALL ERROR
0008            GOTO 99
0009            END

ROUTINES CALLED:
        ERROR

OPTIONS =/OP:1
        BLOCK       LENGTH
        MAGIN       68      (000210)*

COMPILER ----- CORE
            PHASE       USED    FREE
        DECLARATIVES    00702   14625
        EXECUTABLES     00702   14625
        ASSEMBLY        00994   19040

0001            SUBROUTINE XYZIN(X,Y,Z)
        C
0002    102     READ(6,100,ERR=101)X,Y,Z
```

```
0003    100     FORMAT(3F)
0004            RETURN
0005    101     CALL ERROR
0006            GOTO 102
0007            END

ROUTINES CALLED:
                ERROR

OPTIONS =/OP:1

BLOCK       LENGTH
                XYZIN   47    (000136)*

COMPILER ----- CORE
                  PHASE       USED    FREE
                DECLARATIVES  00702   14625
                EXECUTABLES   00702   14625
                ASSEMBLY      00906   19128
        C
0001            SUBROUTINE SNSPOS
        C****
        C
        C       COMMON MEMORY
0002            INTEGER VFLAG, CHGFLG, ELIM, PRCNT
0003            COMMON SNSXYZ(10,3), SNSDAT(10,3), SRCDAT(6), SIMSRC(6),
               1 VFLAG, CHGFLG, PI, N, EPSLON, EPSLNA(10), ICNT, ILIM, ELIM, PRCNT
0004            BYTE ASCII
        C
0005            IF(VFLAG.NE.0)GOTO 300
0006    001     WRITE(6,100)
0007    100     FORMAT('$ENTER NUMBER OF SENSORS(1-10):')
0008            CALL INTIN(2,10,N)
0009            WRITE(6,111)
0010    111     FORMAT(' ENTER SENSOR LOCATIONS X,Y,Z')
0011            DO 200 J=1,N,1
0012    203     WRITE(6,201)J
0013    201     FORMAT('$SENSOR#',I3,':')
0014    200     CALL XYZIN(SNSXYZ(J,1),SNSXYZ(J,2),SNSXYZ(J,3))
0015            RETURN
        C
        C       COMES HERE ON VERIFY
        C
0016    300     WRITE(6,301)N
0017    301     FORMAT('$NUMBER OF SENSORS=',I3,':')
0018            READ(6,302)ASCII
0019            IF(ASCII.NE.'N')GOTO 400
0020            WRITE(6,100)
0021            CALL INTIN(2,10,N)
0022            CHGFLG=-1
0023    400     WRITE(6,401)
0024    401     FORMAT(' SENSOR VALUES X,Y,Z:')
0025            DO 500 J=1,N,1
0026            WRITE(6,303)J,SNSXYZ(J,1),SNSXYZ(J,2),SNSXYZ(J,3)
0027    303     FORMAT('$SENSOR#',I2,'=',F,',',F,',',F,':')
0028            READ(6,302)ASCII
0029    302     FORMAT(1A1)
0030            IF(ASCII.NE.'N')GOTO 500
0031    403     WRITE(6,201)J
0032            CALL XYZIN(SNSXYZ(J,1),SNSXYZ(J,2),SNSXYZ(J,3))
0033            CHGFLG=-1
0034    500     CONTINUE
0035            RETURN
0036            END
```

ROUTINES CALLED:
INTIN , XYZIN

OPTIONS =/OP:1

| BLOCK  | LENGTH |          |
|--------|--------|----------|
| SNSPOS | 470    | (001654)*|
| .$$$$. | 182    | (000554) |

COMPILER ----- CORE

| PHASE       | USED  | FREE  |
|-------------|-------|-------|
| DECLARATIVES| 00799 | 14528 |
| EXECUTABLES | 00943 | 14384 |
| ASSEMBLY    | 01383 | 18651 |

```
            C
0001            SUBROUTINE SRCPOS(AA)
0002            DIMENSION AA(6)
            C****
            C
            C     COMMON MEMORY
0003            INTEGER VFLAG,CHGFLG,ELIM,PRCNT
0004            COMMON SNSXYZ(10,3),SNSDAT(10,3),SRCDAT(6),SIMSRC(6),
               1 VFLAG,CHGFLG,PI,N,EPSLON,EPSLNA(10),ICNT,ILIM,ELIM,PRCNT
0005            BYTE ASCII
0006            IF(VFLAG.NE.0)GOTO 500
0007   001      WRITE(6,100)
0008   100      FORMAT('$ENTER SOURCE X,Y,Z:')
0009            CALL XYZIN(AA(1),AA(2),AA(3))
0010            CALL AZIN(AA(4))
0011            CALL ELIN(AA(5))
0012            CALL MAGIN(AA(6))
0013            RETURN
            C
0014   500      WRITE(6,501)AA(1),AA(2),AA(3)
0015   501      FORMAT('$SOURCE X,Y,Z=',F,',',F,',',F,':')
0016            READ(6,502)ASCII
0017   502      FORMAT(1A1)
0018            IF(ASCII.NE.'N')GOTO 600
0019            WRITE(6,100)
0020            CALL XYZIN(AA(1),AA(2),AA(3))
0021   600      WRITE(6,601)AA(4)
0022   601      FORMAT('$AZIMUTH=',F,':')
0023            READ(6,502)ASCII
0024            IF(ASCII.NE.'N')GOTO 700
0025            CALL AZIN(AA(4))
0026   700      WRITE(6,701)AA(5)
0027   701      FORMAT('$ELEVATION=',F,':')
0028            READ(6,502)ASCII
0029            IF(ASCII.NE.'N')GOTO 800
0030            CALL ELIN(AA(5))
0031   800      WRITE(6,801)AA(6)
0032   801      FORMAT('$MAGNITUDE=',F,':')
0033            READ(6,502)ASCII
0034            IF(ASCII.NE.'N')GOTO 900
0035            CALL MAGIN(AA(6))
0036   900      RETURN
0037            END
```

ROUTINES CALLED:
XYZIN , AZIN , ELIN , MAGIN

OPTIONS =/OP:1

| BLOCK  | LENGTH |          |
|--------|--------|----------|
| SRCPOS | 488    | (001720)*|
| .$$$$. | 182    | (000554) |

COMPILER ----- CORE

```
            PHASE       USED   FREE
       DECLARATIVES   00879  14448
        EXECUTABLES   00943  14384
        ASSEMBLY      01371  18663
        C
0001            SUBROUTINE SIMDAT
        C*****
        C       COMMON MEMORY
0002            INTEGER VFLAG,CHGFLG,ELIM,PRCNT
0003            COMMON SNSXYZ(10,3),SNSDAT(10,3),SRCDAT(6),SIMSRC(6),
               1 VFLAG,CHGFLG,PI,N,EPSLON,EPSLNA(10),ICNT,ILIM,ELIM,PRCNT
0004            BYTE ASCII
        C
0005            WRITE(6,100)
0006    100     FORMAT(' ENTER SIMULATED SOURCE DATA')
0007            CALL SRCPOS(SIMSRC)
0008            DO 200 J=1,N,1
0009            K=J
0010    200     CALL ESTH(SNSXYZ,K,SIMSRC,SNSDAT(J,1),SNSDAT(J,2),SNSDAT(J,3))
0011            RETURN
0012            END

ROUTINES CALLED:
        SRCPOS, ESTH

OPTIONS =/OP:1
        BLOCK        LENGTH
        SIMDAT  119  (000356)*
        .$$$$.  182  (000554)

COMPILER ----- CORE
            PHASE       USED   FREE
       DECLARATIVES   00799  14528
        EXECUTABLES   00863  14464
        ASSEMBLY      01143  18891
        C
0001            SUBROUTINE ESTH(AA,J,SRCDT,XH,YH,ZH)
0002            REAL M
0003            DIMENSION AA(10,3),SRCDT(6)
0004            PI=3.141593
0005            X=SRCDT(1)
0006            Y=SRCDT(2)
0007            Z=SRCDT(3)
0008            A=SRCDT(4)
0009            B=SRCDT(5)
0010            M=SRCDT(6)
0011            XX=AA(J,1)
0012            YY=AA(J,2)
0013            ZZ=AA(J,3)
0014            XM=M*COS(A)*COS(B)
0015            YM=M*SIN(B)
0016            ZM=M*SIN(A)*COS(B)
0017            XI=X-XX
0018            YI=Y-YY
0019            ZI=Z-ZZ
0020            R=SQRT(XI**2+YI**2+ZI**2)
0021            W=1/(4.0*PI*R**5)
0022            XH=W*(XM*(2*XI**2-YI**2-ZI**2)+3.0*XI*(YM*YI+ZM*ZI))
0023            YH=W*(3*YI*(XM*XI+ZM*ZI)+YM*(2*YI**2-ZI**2-XI**2))
0024            ZH=W*(3*ZI*(XM*XI+YM*YI)+ZM*(2*ZI**2-XI**2-YI**2))
0025            RETURN
0026            END

ROUTINES CALLED:
        COS  ,  SIN  ,  SQRT
```

```
OPTIONS =/OP:1
```

| BLOCK | LENGTH |
|-------|--------|
| ESTH  | 445    (001572)* |

```
COMPILER ----- CORE
    PHASE      USED  FREE
DECLARATIVES  00622 14705
EXECUTABLES   01023 14304
ASSEMBLY      01150 18884
KB:<BHSBR2.LST
```

FORTRAN V09.02                    14:10:07    19-MAR-79    PAGE    1

```
            C
            C      BHSBR2.FTN[200,200]
            C
0001               SUBROUTINE PRNSET
            C******
            C      COMMON MEMORY
0002               INTEGER VFLAG,CHGFLG,PRNCNT,PRNKNT,ELIM,PRCNT,ECFLAG
0003               COMMON SNSXYZ(10,3),SNSDAT(10,3),SRCDAT(6),SIMSRC(6),
                  1 VFLAG,CHGFLG,PI,N,EPSLON,EPSLNA(10),ICNT,ILIM,ELIM,PRCNT,
                  2 LINCNT,PRNCNT,PRNKNT,EPSLIM,ECFLAG
0004               BYTE ASCII
            C
0005               IF(VFLAG.NE.0)GOTO 400
0006        99     WRITE(6,100)
0007        100    FORMAT('$ENTER NUMBER OF ITERATIONS BETWEEN PRINT:')
0008               CALL INTIN(0,100,PRNCNT)
0009               WRITE(6,200)
0010        200    FORMAT('$PRINT EPSILON COMPONENTS?:')
0011               READ(6,201)ASCII
0012        201    FORMAT(1A1)
0013               ECFLAG=0
0014               IF(ASCII.NE.'Y')GOTO 300
0015               ECFLAG=-1
0016        300    PRNKNT=0
0017               RETURN
            C
0018        400    WRITE(6,401)
0019        401    FORMAT('$CHANGE PRINT PARAMETERS?:')
0020               READ(6,201)ASCII
0021               IF(ASCII.EQ.'Y')GOTO 99
0022               RETURN
0023               END

ROUTINES CALLED:
            INTIN

OPTIONS =/OP:1
```

| BLOCK  | LENGTH |
|--------|--------|
| PRNSET | 231    (000716)* |
| $$$$   | 192    (000600) |

```
COMPILER ----- CORE
    PHASE      USED  FREE
DECLARATIVES  00884 14443
EXECUTABLES   00943 14384
ASSEMBLY      01259 18775
```

FORTRAN V09.02                    14:10:24    19-MAR-79    PAGE    1

```
            C
0001               SUBROUTINE PRINT
            C******
            C      COMMON MEMORY
```

```
0002            INTEGER VFLAG, CHGFLG, PRNCNT, PRNKNT, ELIM, PRCNT, ECFLAG
0003            COMMON SNSXYZ(10,3), SNSDAT(10,3), SRCDAT(6), SIMSRC(6),
               1 VFLAG, CHGFLG, PI, N, EPSLON, EPSLNA(10), ICNT, ILIM, ELIM, PRCNT,
               2 LINCNT, PRNCNT, PRNKNT, EPSLIM, ECFLAG
        C
        C
0001            SUBROUTINE REALDT
        C*****
        C       COMMON MEMORY
0002            INTEGER VFLAG, CHGFLG, ELIM, PRCNT
0003            COMMON SNSXYZ(10,3), SNSDAT(10,3), SRCDAT(6), SIMSRC(6),
               1 VFLAG, CHGFLG, PI, N, EPSLON, EPSLNA(10), ICNT, ILIM, ELIM, PRCNT
0004            BYTE ASCII
        C
0005            IF(VFLAG. NE. 0)GOTO 300
0006            WRITE(6,100)
0007  100       FORMAT(' ENTER DATA FOR EACH SENSOR X, Y, Z')
0008            DO 200 J=1, N, 1
0009  102       WRITE(6,101)J
0010  101       FORMAT(' $SENSOR#', I3, ':')
0011  200       CALL XYZIN(SNSDAT(J,1), SNSDAT(J,2), SNSDAT(J,3))
0012            RETURN
        C
0013  300       DO 900 J=1, N
0014            WRITE(6,301)J, SNSDAT(J,1), SNSDAT(J,2), SNSDAT(J,3)
0015  301       FORMAT(' $SENSOR#', I3, '=', F, ',', F, ',', F, ':')
0016            READ(6,302)ASCII
0017  302       FORMAT(1A1)
0018            IF(ASCII. NE. 'N')GOTO 900
0019            WRITE(6,101)J
0020            CALL XYZIN(SNSDAT(J,1), SNSDAT(J,2), SNSDAT(J,3))
0021  900       CONTINUE
0022            RETURN
0023            END
```

ROUTINES CALLED:
XYZIN

OPTIONS =/OP:1

| BLOCK | LENGTH | |
|---|---|---|
| REALDT | 305 | (001142)* |
| .$$$$. | 182 | (000554) |

COMPILER ----- CORE
| PHASE | USED | FREE |
|---|---|---|
| DECLARATIVES | 00799 | 14528 |
| EXECUTABLES | 00863 | 14464 |
| ASSEMBLY | 01307 | 18727 |

```
0004            PRNKNT=0
0005            IF(ECFLAG. NE. 0)GOTO 99
0006            IF(LINCNT. NE. 0)GOTO 200
0007  99        LINCNT=64
0008            WRITE(6,100)
0009  100       FORMAT(' ',T3,'I',T11,'X',T21,'Y',T31,'Z',T41,'A',T51,
               1 'E',T61,'M',T71,'E')
0010  200       AZ=DDEG(SRCDAT(4))
0011            EL=DDEG(SRCDAT(5))
0012            WRITE(6,201)ICNT, SRCDAT(1), SRCDAT(2), SRCDAT(3),
               1 AZ, EL, SRCDAT(6), EPSLON
0013  201       FORMAT(' ',I5,5F10.3,2E10.3)
0014            LINCNT=LINCNT-1
0015            IF(ECFLAG. EQ. 0)GOTO 400
0016            DO 300 J=1, N, 1
0017  300       WRITE(6,301)J, EPSLNA(J)
0018  301       FORMAT(' EPSILON', I2, '=', E10.3)
0019  400       RETURN
0020            END
```

```
        ROUTINES CALLED:
        DDEG

OPTIONS =/OP:1

BLOCK      LENGTH
        PRINT      265    (001022)*
        .$$$$.     192    (000600)

COMPILER ----- CORE
          PHASE         USED   FREE
        DECLARATIVES   00622  14705
        EXECUTABLES    00964  14363
        ASSEMBLY       01291  18743

FORTRAN V09.02                     14:10:42    19-MAR-79    PAGE   1

C
0001            SUBROUTINE SETLIM
        C******
        C       COMMON MEMORY
0002            INTEGER VFLAG,CHGFLG,PRNCNT,PRNKNT,ELIM,PRCNT,ECFLAG
0003            COMMON SNSXYZ(10,3),SNSDAT(10,3),SRCDAT(6),SIMSRC(6),
               1 VFLAG,CHGFLG,PI,N,EPSLON,EPSLNA(10),ICNT,ILIM,ELIM,PRCNT,
               2 LINCNT,PRNCNT,PRNKNT,EPSLIM,ECFLAG
        C
0004            WRITE(6,100)
0005    100     FORMAT('$ENTER EPSILON LIMIT:')
0006            CALL FPIN(0.0,10000.0,EPSLIM)
0007            WRITE(6,200)
0008    200     FORMAT('$ENTER ITERATION LIMIT:')
0009            CALL INTIN(0,30000,ILIM)
0010            RETURN
0011            END

ROUTINES CALLED:
        FPIN  ,  INTIN

OPTIONS =/OP:1

BLOCK      LENGTH
        SETLIM     92     (000270)*
        .$$$$.     192    (000600)

COMPILER ----- CORE
          PHASE         USED   FREE
        DECLARATIVES   00884  14443
        EXECUTABLES    00863  14464
        ASSEMBLY       01087  18947

0001            SUBROUTINE DUMMY
0002    100     RETURN
0003            END

OPTIONS =/OP:1

BLOCK      LENGTH
        DUMMY      10     (000024)*

COMPILER ----- CORE
          PHASE         USED   FREE
        DECLARATIVES   00702  14625
        EXECUTABLES    00702  14625
        ASSEMBLY       00842  19192
        C
0001            SUBROUTINE STGAIN
        C
        C       COMMON MEMORY
```

```
0002            INTEGER VFLAG,CHGFLG,PRNCNT,PRNKNT,ELIM,PRCNT,ECFLAG
0003            COMMON SNSXYZ(10,3),SNSDAT(10,3),SRCDAT(6),SIMSRC(6),
               1 VFLAG,CHGFLG,PI,N,EPSLON,EPSLNA(10),ICNT,ILIM,ELIM,PRCNT,
               2 LINCNT,PRNCNT,PRNKNT,EPSLIM,ECFLAG,GAINX,GAINA,
               3 GAINB,GAINM,KERR
0004            BYTE ASCII
       C
0005            IF(VFLAG.NE.0)GOTO 400
0006     99     WRITE(6,100)
0007     100    FORMAT('$ENTER GAIN FOR X,Y,Z:')
0008            CALL FPIN(0.0,100000.,GAINX)
0009            WRITE(6,101)
0010     101    FORMAT('$ENTER GAIN FOR AZIMUTH:')
0011            CALL FPIN(0.0,100000.,GAINA)
0012            WRITE(6,102)
0013     102    FORMAT('$ENTER GAIN FOR ELEVATION:')
0014            CALL FPIN(0.0,100000.,GAINB)
0015            WRITE(6,103)
0016     103    FORMAT('$ENTER GAIN FOR MAGNITUDE:')
0017            CALL FPIN(0.0,100000.,GAINM)
       C        GAINA=GAINX
       C        GAINB=GAINA
       C        GAINM=GAINX
0018            RETURN
       C
0019     400    WRITE(6,401)GAINX
0020     401    FORMAT('$GAIN= ',F,':')
0021            READ(6,402)ASCII
0022     402    FORMAT(1A1)
0023            IF(ASCII.EQ.'N')GOTO 99
0024            RETURN
0025            END

ROUTINES CALLED:
       FPIN

OPTIONS =/OP:1

BLOCK       LENGTH
       STGAIN  258    (001004)*
       .$$$$.  202    (000624)

COMPILER ----- CORE
          PHASE       USED   FREE
       DECLARATIVES   00889  14438
       EXECUTABLES    00943  14384
       ASSEMBLY       01247  18787
```

APPENDIX B

RU BHLOC0

BOREHOLE LOCATOR PROGRAM-MULTI-SENSOR/SINGLE SOURCE
ENTER NUMBER OF SENSORS(1-10):2

ENTER SENSOR LOCATIONS X,Y,Z
SENSOR# 1:-50.,-5.,-50.

SENSOR# 2:60.,10.,-40.

ENTER SOURCE X,Y,Z:10.,10.,40.

ENTER AZIMUTH:10.

ENTER ELEVATION:-3.

ENTER MAGNITUDE:900000.

ENTER S(SIMULATED) OR R(REAL)DATA:R

ENTER DATA FOR EACH SENSOR X,Y,Z
SENSOR#  1:-.0352759,.0092257,.1142375

SENSOR#  2:.0196628,.0027575,-.1041084

ENTER NUMBER OF ITERATIONS BETWEEN PRINT:1

PRINT EPSILON COMPONENTS?:NO

ENTER GAIN FOR X,Y,Z:.35

ENTER GAIN FOR AZIMUTH:.01

ENTER GAIN FOR ELEVATION:.01

ENTER GAIN FOR MAGNITUDE:50

ENTER EPSILON LIMIT:0.

ENTER ITERATION LIMIT:20

ENTER-R(RESTART),V(VERIFY),I(ITERATE),C(CONTINUE) OR T(TERMINATE)C

| I | X | Y | Z | A | E | M | E |
|---|---|---|---|---|---|---|---|
| 1 | 4.013 | 10.000 | 40.000 | 10.000 | -3.000 | 0.907E 06 | 0.576E-02 |
| 2 | 1.398 | 10.000 | 40.000 | 3.328 | -3.000 | 0.919E 06 | 0.360E-02 |
| 3 | -0.817 | 10.000 | 37.924 | 3.328 | -3.000 | 0.934E 06 | 0.198E-02 |
| 4 | -2.331 | 10.000 | 36.025 | 3.328 | -3.000 | 0.944E 06 | 0.125E-02 |
| 5 | -4.468 | 10.000 | 36.025 | 3.328 | -3.000 | 0.948E 06 | 0.845E-03 |
| 6 | -5.536 | 10.000 | 34.309 | 3.328 | -3.000 | 0.953E 06 | 0.594E-03 |
| 7 | -7.296 | 10.000 | 34.309 | 3.328 | -3.000 | 0.952E 06 | 0.460E-03 |
| 8 | -8.108 | 9.208 | 34.309 | 3.328 | -1.495 | 0.953E 06 | 0.346E-03 |
| 9 | -8.806 | 8.661 | 34.309 | 3.328 | -0.357 | 0.953E 06 | 0.213E-03 |
| 10 | -8.806 | 8.082 | 34.309 | 3.328 | 0.972 | 0.954E 06 | 0.135E-03 |
| 11 | -9.383 | 7.665 | 34.309 | 3.328 | 0.972 | 0.954E 06 | 0.838E-04 |
| 12 | -9.383 | 7.303 | 34.309 | 3.328 | 1.909 | 0.954E 06 | 0.653E-04 |
| 13 | -9.383 | 6.760 | 34.309 | 3.328 | 1.909 | 0.954E 06 | 0.425E-04 |
| 14 | -9.383 | 6.501 | 34.741 | 3.328 | 1.909 | 0.954E 06 | 0.328E-04 |
| 15 | -9.383 | 6.255 | 34.428 | 3.328 | 1.909 | 0.956E 06 | 0.293E-04 |
| 16 | -9.657 | 6.088 | 34.428 | 3.328 | 2.322 | 0.956E 06 | 0.248E-04 |
| 17 | -9.657 | 5.946 | 34.640 | 3.624 | 2.322 | 0.956E 06 | 0.181E-04 |
| 18 | -9.657 | 5.587 | 34.640 | 3.624 | 2.322 | 0.957E 06 | 0.141E-04 |
| 19 | -9.657 | 5.384 | 34.640 | 3.624 | 2.745 | 0.958E 06 | 0.111E-04 |
| 20 | -9.812 | 5.236 | 34.875 | 3.624 | 2.745 | 0.958E 06 | 0.807E-05 |
| 20 | -9.812 | 5.236 | 34.875 | 3.624 | 2.745 | 0.958E 06 | 0.807E-05 |

ENTER-R(RESTART),V(VERIFY),I(ITERATE)OR T(TERMINAT)V

NUMBER OF SENSORS=  2:

SENSOR VALUES X,Y,Z:
SENSOR#  1=    -50.0000000,    -5.0000000,    -50.0000000:

SENSOR#  2=     60.0000000,    10.0000000,    -40.0000000:

SOURCE X,Y,Z=   -9.8124847,     5.2362385,    34.8750153:

AZIMUTH=    0.0632573:

ELEVATION=  0.0479045:

MAGNITUDE= 958276.8750000:

ENTER S(SIMULATED) OR R(REAL)DATA:R

SENSOR#  1=    -0.0352759,    0.0092257,    0.1142375:

SENSOR# 2=    0.0196628,    0.0027575,    -0.1041084;

CHANGE PRINT PARAMETERS?:YES

ENTER NUMBER OF ITERATIONS BETWEEN PRINT:20

PRINT EPSILON COMPONENTS?:NO

GAIN=    0.3500000:YES

ENTER EPSILON LIMIT:0.

ENTER ITERATION LIMIT:1000

ENTER-R(RESTART),V(VERIFY),I(ITERATE),C(CONTINUE) OR T(TERMINATE)C

| | | | | | | | | |
|---|---|---|---|---|---|---|---|---|
| 40  | -9.982  | 5.053 | 35.429 | 3.866 | 3.166 | 0.566E 06 | 0.414E-05 |
| 60  | -9.959  | 5.053 | 35.246 | 3.892 | 3.104 | 0.973E 06 | 0.170E-05 |
| 80  | -9.987  | 5.028 | 35.546 | 3.893 | 2.998 | 0.987E 06 | 0.653E-06 |
| 100 | -9.960  | 5.091 | 35.679 | 3.956 | 2.998 | 0.989E 06 | 0.405E-06 |
| 120 | -9.973  | 5.013 | 35.714 | 3.956 | 2.998 | 0.992E 06 | 0.204E-06 |
| 140 | -9.983  | 4.977 | 35.804 | 3.929 | 2.998 | 0.994E 06 | 0.117E-06 |
| 160 | -9.983  | 4.982 | 35.848 | 4.035 | 2.998 | 0.996E 06 | 0.631E-07 |
| 180 | -9.995  | 4.985 | 35.917 | 3.990 | 2.998 | 0.997E 06 | 0.289E-07 |
| 200 | -9.995  | 4.987 | 35.938 | 3.990 | 2.998 | 0.998E 06 | 0.164E-07 |
| 220 | -9.995  | 4.995 | 35.967 | 3.992 | 2.998 | 0.999E 06 | 0.526E-08 |
| 240 | -9.997  | 4.996 | 35.968 | 3.996 | 2.998 | 0.999E 06 | 0.315E-08 |
| 260 | -9.997  | 4.995 | 35.970 | 3.996 | 2.998 | 0.999E 06 | 0.256E-08 |
| 280 | -9.998  | 4.999 | 35.978 | 3.998 | 3.001 | 0.999E 06 | 0.159E-08 |
| 300 | -9.999  | 4.999 | 35.986 | 3.998 | 3.001 | 0.100E 07 | 0.775E-09 |
| 320 | -9.998  | 4.999 | 35.989 | 3.995 | 2.996 | 0.100E 07 | 0.459E-09 |
| 340 | -9.999  | 4.999 | 35.991 | 3.999 | 3.003 | 0.100E 07 | 0.270E-09 |
| 360 | -9.999  | 4.999 | 35.993 | 3.999 | 3.000 | 0.100E 07 | 0.209E-09 |
| 380 | -9.999  | 4.999 | 35.996 | 3.999 | 3.000 | 0.100E 07 | 0.824E-10 |
| 400 | -10.000 | 5.000 | 35.996 | 3.999 | 3.000 | 0.100E 07 | 0.404E-10 |
| 420 | -10.000 | 5.000 | 35.997 | 3.999 | 3.000 | 0.100E 07 | 0.338E-10 |
| 440 | -10.000 | 5.000 | 35.998 | 4.000 | 3.000 | 0.100E 07 | 0.215E-10 |
| 460 | -10.000 | 5.000 | 35.998 | 4.000 | 3.000 | 0.100E 07 | 0.109E-10 |
| 480 | -10.000 | 5.000 | 35.998 | 4.000 | 3.000 | 0.100E 07 | 0.700E-11 |
| 500 | -10.000 | 5.000 | 35.999 | 4.000 | 3.000 | 0.100E 07 | 0.462E-11 |
| 520 | -10.000 | 5.000 | 35.999 | 4.000 | 3.000 | 0.100E 07 | 0.250E-11 |
| 540 | -10.000 | 5.000 | 35.999 | 4.000 | 3.000 | 0.100E 07 | 0.122E-11 |
| 560 | -10.000 | 5.000 | 36.000 | 4.000 | 3.000 | 0.100E 07 | 0.581E-12 |
| 580 | -10.000 | 5.000 | 36.000 | 4.000 | 3.000 | 0.100E 07 | 0.265E-12 |
| 600 | -10.000 | 5.000 | 36.000 | 4.000 | 3.000 | 0.100E 07 | 0.145E-12 |
| 620 | -10.000 | 5.000 | 36.000 | 4.000 | 3.000 | 0.100E 07 | 0.912E-13 |
| 640 | -10.000 | 5.000 | 36.000 | 4.000 | 3.000 | 0.100E 07 | 0.556E-13 |
| 660 | -10.000 | 5.000 | 36.000 | 4.000 | 3.000 | 0.100E 07 | 0.372E-13 |
| 680 | -10.000 | 5.000 | 36.000 | 4.000 | 3.000 | 0.100E 07 | 0.364E-13 |
| 700 | -10.000 | 5.000 | 36.000 | 4.000 | 3.000 | 0.100E 07 | 0.357E-13 |
| 720 | -10.000 | 5.000 | 36.000 | 4.000 | 3.000 | 0.100E 07 | 0.350E-13 |
| 740 | -10.000 | 5.000 | 36.000 | 4.000 | 3.000 | 0.100E 07 | 0.343E-13 |
| 760 | -10.000 | 5.000 | 36.000 | 4.000 | 3.000 | 0.100E 07 | 0.336E-13 |
| 780 | -10.000 | 5.000 | 36.000 | 4.000 | 3.000 | 0.100E 07 | 0.330E-13 |
| 800 | -10.000 | 5.000 | 36.000 | 4.000 | 3.000 | 0.100E 07 | 0.323E-13 |

What is claimed is:

1. In a method employing an alternating magnetic field for determining location, the steps of:
   transmitting an alternating magnetic field from a transmitter station means;
   receiving the transmitted alternating field at receiving station means spaced from said transmitter station means to derive a plurality of independent magnetic field components of the complex vector field being received, each of said independent magnetic field components having amplitude and phase information;
   successively approximating the relative location of said transmitter and receiver station means one with respect to the other using primarily the amplitude information of said derived independent magnetic field components and successively determining said magnetic field components that would have been received at said receiver station means for each approximated relative location; and
   comparing said successively determined field components with said received field components to derive a convergence between the approximated relative locations of said transmitter and receiver station means for determining the relative location of said transmitter and receiver station means one with respect to the other.

2. The method of claim 1 wherein said receiving station means comprises a plurality of three axes receiving stations the spacing between said receiving stations being known and the relative orientation of the axes of said receiving stations being known and said transmitter station means comprising essentially only one single axis transmitter station.

3. The method of claim 1 wherein said transmitter station means comprises a plurality of three axes transmitter stations with the spacing between said transmitter stations being known and the relative orientation of their three axes one with respect to the other being known, and wherein said receiver station means comprises essentially only one single axis receiver station.

4. The method of claim 1 wherein said transmitter station means comprises a plurality of single axis transmitter stations the spacing between said transmitter stations being known and the orientation of the transmitting axes being known one relative to the other, and wherein said receiver station means comprises essentially only a single three-axis receiver station.

5. The method of claim 1 wherein said transmitter station means comprises essentially only a single two-axis transmitter station with the orientation of the transmitter axes being known one relative to the other, and said receiver station means comprising essentially only a single three-axis receiver station.

6. The method of claim 1 wherein said transmitter station means comprises a plurality of single axis transmitter stations with the axes of said plural transmitter stations being essentially co-linear and with the distance between said transmitter stations being known and wherein said receiver station means comprises essentially only a single three-axis receiver station, the location of which is known and the relative orientation of said receiver station axes being known for determining the unknown location of said transmitting stations relative to said receiving station.

7. The method of claim 1 wherein said transmitter station means comprises essentially only one single axis transmitter station, the position of which is known and said receiver station means comprises essentially only a single three-axis receiver station, whereby the relative location of said unknown receiver station is determined relative to said known location of said transmitter station.

8. In a method employing an alternating magnetic field for determining location, the steps of:
   transmitting an alternating magnetic field from essentially only a single axis transmitter station;
   receiving the transmitted alternating magnetic field at a plurality of three axes magnetic field receiver stations with the axes of said receiver stations being known relative to each other and the spacing between the plural receiving stations being known to derive a plurality of independent magnetic field components, each of said independent magnetic field components having amplitude and phase information; and
   determining from said received magnetic field components, by using primarily the amplitude information of said derived independent magnetic field components, the location of said transmitter station relative to said receiver stations.

9. In a method employing an alternating magnetic field for determining location, the steps of:
   transmitting alternating magnetic fields from a plurality of three axes transmitter stations with the spacing between transmitter stations being known and the relative orientation of their three axes one with respect to the other being known;
   receiving the transmitted alternating magnetic fields at essentially only one single axis magnetic field receiving station spaced from said transmitter stations to derive a plurality of independent magnetic field components of the complex vector fields being received, each of said independent magnetic field components having amplitude and phase information; and
   determining by using primarily the amplitude information of said derived independent magnetic field components of the received complex vector fields the relative location of said transmitting stations relative to said receiving station.

10. In a method employing an alternating magnetic field for determining location, the steps of;
   transmitting alternating magnetic fields from a plurality of single axis transmitter stations, the spacing between said transmitter stations being known and the orientation of the transmitting station axes being known, one relative to the other;
   receiving the transmitted alternating magnetic fields at a receiving station comprising essentially only a single three-axis magnetic field receiver to derive a plurality of independent magnetic field components of the complex vector fields being received, each of said independent magnetic field components having amplitude and phase information; and
   determining, by using primarily the amplitude information of said derived independent magnetic field components of, said received complex vector fields the relative location of said transmitter and receiver stations one with respect to the other.

11. In a method employing an alternating magnetic field for determining location, the steps of:
   transmitting alternating magnetic fields from essentially only a single two-axis transmitter station with the orientation of the transmitter axes being known one relative to the other;

receiving the transmitted alternating magnetic fields at essentially only a single three-axis receiver station to derive a plurality of independent magnetic field components of the complex vector fields being received, each of said independent magnetic field components having amplitude and phase information,: and determining from, primarily the amplitude information of said derived independent magnetic field components of, the received complex vector fields the relative location of said transmitter and receiver stations one with respect to the other.

12. In a method employing alternating magnetic fields for determining location, the steps of:
  transmitting alternating magnetic fields from a plurality of single-axis transmitter stations, the axes of said transmitter stations being essentially colinear and the distance between said transmitter stations being known;
  receiving the transmitted alternating magnetic fields at essentially only a single three-axis receiver station, the location of which is known and the relative orientation of said axes of said receiver station being known to derive a plurality of independent magnetic field components of the complex vector fields being received, each of said derived independent magnetic field components having amplitude and phase information; and
  determining by using primarily the amplitude information of said derived independent magnetic field components of the received complex vector fields the unknown location of said transmitting stations relative to said receiving station.

13. In a method employing an alternating magnetic field for determining location, the steps of:
  transmitting an alternating magnetic field from essentially only one single axis transmitter station, the position of which is known;
  receiving the transmitted alternating magnetic field at a receiving station comprising essentially only a single three-axis magnetic field receiver to derive a plurality of independent magnetic field components of the complex vector field being received, each of said derived magnetic field components having amplitude and phase information; and
  determining by using primarily the amplitude information of said derived independent magnetic field components of said received complex vector field the relative location of said unknown receiver station relative to said known location of said transmitter station.

14. In a method employing an alternating magnetic field for determining orientation, the steps of:
  transmitting an alternating magnetic field from transmitter station means;
  receiving the transmitted alternating field at receiving station means spaced from said transmitter station means to derive a plurality of independent magnetic field components of the complex vector field being received, each of said independent magnetic field components having amplitude and phase information;
  successively approximating the relative orientation of said transmitter and receiver stations, one with respect to the other by using primarily the amplitude information of said derived independent magnetic field components, and successively determining said magnetic field components that would have been received at said receiver station means for each approximated relative orientation; and
  comparing said successively determined field components with said received field components to derive a convergence between the approximated relative orientations of said transmitter and receiver stations for determining the relative orientation of said transmitter and receiver station means one with respect to the other.

15. In an apparatus employing an alternating magnetic field for determining location,
  means for transmitting an alternating magnetic field from a transmitter station means;
  means for receiving the transmitted alternating field at receiving station means spaced from said transmitter station means to derive a plurality of independent magnetic field components of the complex vector field being received, each of said independent magnetic field components having amplitude and phase information;
  means for successively approximating the relative location of said transmitter and receiver station means one with respect to the other by using primarily the amplitude information of said derived independent magnetic field components, and successively determining said magnetic field components that would have been received at said receiver station means for each approximated relative location; and
  means for comparing said successively determined field components with said received field components to derive a convergence between the approximated relative locations of said transmitter and receiver station means for determining the relative locations of said transmitter and receiver station means one with respect to the other.

16. The apparatus of claim 15 wherein said receiving station means comprises a plurality of three axes receiving stations the spacing between said receiving stations being known and the relative orientation of the axes of said receiving stations being known and said transmitter station means comprising essentially only one single axis transmitter station.

17. In a method employing an alternating quasi-static magnetic field for guidance of a transmitter, the steps of:
  transmitting a quasi-static alternating magnetic field from essentially only a single axis transmitter station movable along a course;
  receiving the transmitted quasi-static alternating magnetic field at a fixed three-axis magnetic field receiving station spaced from said transmitter station to derive a plurality of independent magnetic field components of the complex vector field or fields being received, each of said independent magnetic field components having amplitude and phase information; and
  determining by using primarily the amplitude information of said derived independent magnetic field components from said received complex vector field a steering signal for guiding the course of said transmitter station relative to said receiver station.

18. The method of claim 17 wherein the guidance signal is such as to guide the transmitter station over a course having a predetermined profile and wherein;
  the magnetic moment of the transmitter station and the inclination of the single axis transmitter station are known quantities; and
  wherein said known magnetic moment and said known inclination quantities are used with said derived independent magnetic field components to derive the guidance signal for guiding the movable transmitter station over a course having the predetermined profile.

19. The method of claim 17 wherein the guidance signal is such as to guide the movable transmitter station over a course having a predetermined profile and wherein;

the inclination of the single axis transmitter station and the transmitter course length from a predetermined start position are known quantities; and wherein said known inclination and said known course length quantities are used with said derived independent magnetic field components to derive the guidance signal for guiding the movable transmitter station over a course having the predetermined profile.

20. In a method employing an alternating quasi-static magnetic field for determining location, the steps of:

transmitting a quasi-static alternating magnetic field from a plurality of single axis transmitter stations with the axes of said plural transmitter stations being essentially colinear and with the distance between said transmitter stations being known;

receiving the transmitted quasi-static alternating magnetic field at a single three-axis receiver station the location of which is known and the relative orientation of said transmitter station axes being known to derive a plurality of independent magnetic field components of the complex vector field being received, each of said independent magnetic field components having amplitude and phase information; and determining by using primarily the amplitude information of said derived independent magnetic field components of said received complex vector field the unknown location of said transmitting stations relative to said receiving station.

* * * * *